US010524615B2

(12) United States Patent
Reales Bertomeo et al.

(10) Patent No.: US 10,524,615 B2
(45) Date of Patent: Jan. 7, 2020

(54) APPARATUS FOR HEATING AND/OR COOKING MEAT PRODUCTS

(71) Applicant: Emilio Reales Bertomeo, Delmenhorst (DE)

(72) Inventors: Emilio Reales Bertomeo, Delmenhorst (DE); Sylvia Ohlen, Delmenhorst (DE)

(73) Assignee: REAMOTION GMBH, Bremen (DE)

( * ) Notice: Subject to any disclaimer, the term of this patent is extended or adjusted under 35 U.S.C. 154(b) by 225 days.

(21) Appl. No.: 15/320,792

(22) PCT Filed: Jun. 3, 2015

(86) PCT No.: PCT/EP2015/062412
§ 371 (c)(1),
(2) Date: Feb. 26, 2017

(87) PCT Pub. No.: WO2016/000900
PCT Pub. Date: Jan. 7, 2016

(65) Prior Publication Data
US 2017/0231423 A1 Aug. 17, 2017

(30) Foreign Application Priority Data

Jul. 1, 2014 (DE) .................... 20 2014 005 299 U
Apr. 7, 2015 (EP) ..................... 15162664

(51) Int. Cl.
A47J 37/06 (2006.01)
A47J 37/04 (2006.01)

(52) U.S. Cl.
CPC ............. A47J 37/047 (2013.01); A47J 37/06 (2013.01); A47J 37/0629 (2013.01);
(Continued)

(58) Field of Classification Search
CPC ................ A47J 37/0688; A47J 37/0694; A47J 37/0611; A47J 37/0641
(Continued)

(56) References Cited

U.S. PATENT DOCUMENTS 1,729,552 A * 9/1929 Shadley ............... A47J 37/0688
126/41 R
1,870,619 A * 8/1932 Flanzer ................... A47J 37/06
219/394
(Continued)

FOREIGN PATENT DOCUMENTS

DE 935 570 C 11/1955
DE 3519964 A1 12/1986
(Continued)

Primary Examiner — Reginald Alexander
(74) Attorney, Agent, or Firm — BakerHostetler LLP

(57) ABSTRACT

In an apparatus for heating and/or cooking foodstuffs, in particular meat products, comprising an appliance housing with at least one opening, an accommodating device for the meat products to be heated, a heating device associated with the accommodating device and having one or more heating elements, the accommodating device has one or more accommodating compartments which is accessible by way of the opening, and an insertion cassette which corresponds to a respective accommodating compartment and which can be loaded with one or more meat products in a predetermined orientation relative to each other and is adapted to be introduced into and removed again from the accommodating compartment.

19 Claims, 13 Drawing Sheets

(52) U.S. Cl.
CPC ....... *A47J 37/0641* (2013.01); *A47J 37/0688* (2013.01); *A47J 37/0694* (2013.01)

(58) Field of Classification Search
USPC ......... 99/380, 384, 391, 392, 393, 399, 427, 99/439, 440, 441, 476
See application file for complete search history.

(56) References Cited

U.S. PATENT DOCUMENTS

| | | | | |
|---|---|---|---|---|
| 1,910,682 | A * | 5/1933 | Arthur | A47J 37/0623 219/413 |
| 2,689,517 | A * | 9/1954 | Angelus | A47J 37/045 219/388 |
| 3,046,870 | A | 7/1962 | Adam et al. | |
| 5,590,584 | A * | 1/1997 | Ahn | A47J 37/047 219/521 |
| 5,735,191 | A | 4/1998 | Russell et al. | |
| 6,079,319 | A | 6/2000 | Doria | |
| 6,450,085 | B1 * | 9/2002 | Riesselnnann | A47J 37/0623 219/400 |
| 8,109,205 | B1 * | 2/2012 | Winer | A23L 5/10 99/359 |
| 2002/0036195 | A1 | 3/2002 | Loveless | |
| 2004/0144774 | A1 | 7/2004 | Kim | |
| 2009/0140622 | A1 | 6/2009 | Suetsugu | |

FOREIGN PATENT DOCUMENTS

| | | |
|---|---|---|
| DE | 4401281 C1 | 1/1995 |
| DE | 197 30 829 A1 | 1/1999 |
| DE | 20 2009 007012 U1 | 8/2009 |
| EP | 0379755 A1 | 8/1990 |
| WO | 2013/062832 A1 | 5/2013 |

* cited by examiner

APPARATUS FOR HEATING AND/OR COOKING MEAT PRODUCTS

CROSS-REFERENCE TO RELATED APPLICATIONS

This application is a National Stage of International patent application PCT/EP2015/062412, filed on Jun. 3, 2015, which claims priority to German patent application No. DE 20-2014-005299.9, filed on Jul. 1, 2014, and European patent application No. EP 15162664.5, dated Apr. 7, 2015, the disclosures of which are incorporated by reference in their entirety.

FIELD OF THE INVENTION

The invention concerns an apparatus for heating and/or cooking foodstuffs, in particular meat products, comprising an appliance housing with at least one opening, an accommodating device for the meat products to be heated, and a heating device associated with the accommodating device and having one or more heating elements.

BACKGROUND

In the fast food sector inter alia meat products like sausages or burgers are prepared for consumption by means of open grill or cooking units and other foodstuffs like for example French fries are prepared for consumption by frying in an upwardly open fryer which frequently contains vegetable oil. By virtue of the preparation method, conventional preparation produces typically fat-bearing and odorous vapors. For operation of fast-food restaurants and snack bars and take-aways the resulting vapors often represent a problem at many locations. The attempt is made by complicated and expensive suction removal and filter installations to reduce the pollution due to the smells and vapors occurring when preparing foodstuffs.

A further point in the preparation of food in the fast-food industry is to be found in the use of fats and oils as temperature-generating substances. Specifically in the preparation of foodstuffs at excessively low temperatures there is not just the danger of eating an excess of calories caused by the fat or oil in the product. In addition, at excessively high temperatures during the cooking operation, unhealthy decomposition products are produced which are ingested in consumption of the foodstuffs. Therefore the grill and cooking appliances used in the fast-food restaurants and snack bars and take-aways as well as the fryers are to be kept at a given almost uniform temperature level. That however involves a high consumption of energy.

In the case of the conventional preparation methods, in order to be able to guarantee optimum quality of the foodstuff to be prepared, there is also a need for the procedure to be continuously monitored or checked by the operating staff.

DE 20 2009 007 012 U1 discloses for example an apparatus for cooking sausages, by means of which preparation of sausages can be effected as required and thus individually. The sausage cooking apparatus has an accommodating device, similar to a toaster, for a sausage, and a heat source associated with the sausage accommodating device and having at least one heating element. The heating element is a heating casing surrounding the sausage accommodating device. A disadvantage is that on the one hand only a few sausages can be simultaneously prepared with such an apparatus and on the other hand each accommodating device has a heating element surrounding only a single sausage. That means that, in comparative terms, a larger amount of energy is required for an individual sausage to be prepared.

SUMMARY OF THE INVENTION

The object of the present invention is to provide an apparatus for heating and/or cooking foodstuffs, which permits simplified and sparing preparation of a multiplicity of foodstuffs with an overall lower level of energy consumption.

In an apparatus for heating and/or cooking foodstuffs of the kind set forth in the opening part of this specification, that object is attained in that the accommodating device has one or more accommodating compartments which is accessible by way of the opening in the appliance housing, and an insertion cassette which corresponds to a respective accommodating compartment and which can be loaded with a plurality of meat products in a predetermined orientation relative to each other and is adapted to be introduced into and removed again from the accommodating compartment.

The invention is based on the realization that, by means of the insertion cassette which can be introduced into an accommodating compartment and which can be loaded with one, or a plurality of, preferably four, five or more meat products like for example sausages, that provides an accommodating device, also referred to as and in particular in the form of a grill device, by means of which it is possible to ensure a form of heating which is energy-efficient and at the same time careful. In addition it is advantageously possible to preferably minimize the use of fats and oils as temperature-generating substances within the grill device according to the invention. Turning of the foodstuffs accommodated within the insertion cassette is also not required as uniform cooking of in particular the meat product from almost all sides is guaranteed by virtue of the insertion cassette. After they have been prepared, the meat products have a preferably uniform browning for an attractive appearance at their entire surface. With the cassette which preferably surrounds the foodstuff, wherein surrounding does not mean shielding the foodstuff from the heating element, the radiant heat generated by the heating element is received and stored in the foodstuff. Accordingly the food products which are preferably in direct contact with the inside of the insertion cassette are exposed from at least two sides to direct heat transfer.

The term meat products in the present context is used to denote the products or semi-manufactured products made for the major part from muscle tissue and other soft parts of mammals, fowl, fish, crabs or mussels, which are suitable for use in a grill device according to the invention.

A preferred development of the invention provides that there are provided two or more accommodating compartments for accommodating a respective insertion cassette for the meat products to be prepared, wherein an individually or separately controllable heating element is associated with each respective accommodating compartment. The use of two or more accommodating compartments, into each of which a respective insertion cassette can be introduced, makes it possible as required to prepare the desired number of meat products. Insofar as there is a high demand for foodstuffs to be prepared at the same time, like for example meat products, then only one accommodating compartment, two, or, depending on the respective configuration according to the invention of the apparatus, even more accommodating compartments can be fitted with insertion cassettes, in dependence on the desired number of meat products to be heated and/or cooked. As an individually actuable heating element is associated with each accommodating compartment heat energy for the preparation procedure is also required only at the respectively required number of accommodating compartments. Preferably infrared radiation is generated by means of the heating elements associated with the accommodating compartments.

Preferably the accommodating compartment or compartments for the cassettes has an insertion direction extending substantially in the horizontal direction. The selected insertion direction provides that the heat generated within the accommodating device cannot escape almost unimpeded out of the upwardly directed opening, as in the case of the sausage cooking apparatuses known from the state of the art. The heat generated by the heating device is thus kept within the accommodating compartment by the upper closed wall region as, in spite of its lower density, the hot air is prevented from rising by way of the upwardly closed accommodating compartment. This means that the heated air or the heat is effectively used for the heating and/or cooking process. With the exception of its opening region for the insertion of the insertion cassettes, each accommodating compartment preferably has walls which define the accommodating chamber of the accommodating compartment and which provide for delimitation as between the individual accommodating compartments or in relation to the surface of the appliance housing. In addition a preferred configuration of the apparatus according to the invention provides for the use of insulating material between the walls of adjacent accommodating compartments or in relation to the wall of the appliance housing.

Preferably the opening in the appliance housing is substantially completely filled up by a wall region of the insertion cassette which can be inserted in the accommodating compartment. After insertion of the insertion cassette the cassette and the accommodating compartment are arranged relative to each other in such a way that the opening of the accommodating compartment is filled or covered. Heat produced in the interior of the accommodating compartment is preferably then prevented by the wall region of the insertion cassette itself, that extends in the region of the opening, from escaping from the opening which preferably extends in the vertical plane at the front of the appliance housing. Preferably the opening of the accommodating compartment is filled by a wall of the insertion cassette, that extends substantially parallel to the front of the appliance housing. The opening of the accommodating compartment is of a preferably rectangular shape. The edges of the appliance housing, that form the opening, are also at a small spacing of a few millimeters from the insertion cassette which can preferably be pushed into the accommodating compartment.

According to a development of the invention the insertion cassette of the grill device according to the invention has an outer casing which accommodates the meat products and which is provided with a plurality of apertures. By way of the apertures in the outer casing of the insertion cassette which preferably almost completely surrounds the meat products, the radiant heat preferably generated by the heating device can act on a large proportion of the surface of the meat product to be heated or cooked. Preferably the outer casing has apertures in almost all its wall regions. A configuration of the invention provides that solely the wall region of the insertion cassette, that closes the opening of the accommodating compartment, does not have any apertures. In addition the discharge of heat from the accommodating compartment is minimized in that way. The apertures in the outer casing are preferably of the most widely varying forms, like for example in the form of a slot, circular or rectangular. Irregular shapes for the slots in the outer casing are also possible, like for example s-shaped or meander-shaped apertures.

A preferred configuration of the invention provides that the outer casing has two or more wall regions, preferably side walls extending vertically and parallel to the insertion direction into the accommodating compartment and which are of a grid-like configuration. The grid-like configuration of at least the side walls forming the main heat input surfaces of the insertion cassettes has the advantage that the input of heat into the interior of the insertion cassette is further improved. Preferably the meat products come into direct contact with the grid-like wall regions of the insertion cassette, whereby a roasting browning pattern is produced on the surface. The insertion cassette is preferably of a cuboidal configuration, wherein the surfaces of the outer casing, that are arranged adjacent to a heating element of the heating device, have at least apertures in the wall region or a grid-like structure. In a configuration of the invention the heating device forms a kind of heating casing around predetermined wall regions of the insertion cassette.

Another configuration of the insertion cassette according to the invention provides an outer casing comprising preferably two casing portions which are pivotably moveably connected together. The insertion cassette is preferably formed from two casing portions which are moveably connected together by way of a hinge. The moveable coupling of the casing portions ensures easy access to the accommodating chamber or to the interior of the insertion cassette. In that way the meat products to be heated and/or cooked can be easily put into the accommodating chamber of the casing portions of the insertion cassette, that are preferably in the form of pivotable half-shell portions. The casing portions are connected together by way of one or more hinges. The hinge is preferably provided at the wall region of the insertion cassette, that constitutes the lower bottom region of the insertion cassette according to the invention. In that case the hinge is preferably formed from wall regions of the casing portions themselves, which are of a sleeve-like shape and which are preferably held in a predetermined position relative to each other by way of preferably a cylindrical rod.

Preferably on the inside of the accommodating compartment for the meat products the casing portions have limbs extending parallel to each other at predetermined spacings for subdividing the accommodating chamber for the meat products. The limbs which are provided or arranged at the inside ensure a predetermined orientation for the meat products. Contact between the surfaces of the meat products with each other, which would slow down the cooking process, is preferably advantageously avoided by the limbs projecting between mutually adjacent foodstuffs. Preferably four, five or more insertion compartments are provided by means of the limbs extending in the accommodating compartment. An alternative configuration of the invention provides that, instead of limbs which are rigidly formed on the casing portions, insertion elements which can be inserted into the casing portions are used, which can be replaced as desired. The insertion elements ensure that the most widely varying meat products like for example sausages, meatballs, shaped pieces of meat in the form of semi-manufactured products or fillet pieces of fish can be accommodated in a predetermined orientation by way of the insertion cassette. Preferably, insertion elements are used which are provided with patterns matched to the meat products to be prepared, which during the cooking process preferably produce a corresponding pattern on a surface portion of the meat product.

An alternative configuration of the insertion cassettes which can be fitted into the accommodating compartments provides that the casing portions are in the form of two plate bodies which are pivotably moveably connected together and which on mutually facing surface regions have mutually corresponding recesses, preferably hemispherical recesses. The mutually corresponding hemispherical recesses in the two casing portions, in the condition of being folded together, form preferably spherical accommodating chambers. By means of the insertion cassette designed in accordance with the invention, preferably spherical rissoles or burgers can be produced, of dimensions appropriately adapted to the dimensions of the spherical chambers. The hemispherical recesses in a respective plate body have apertures, by way of which the input of heat to an item in the accommodating chamber is improved.

Preferably at least one of the plate bodies is adapted to accommodate a shaping or stamping insert which can be arranged at the inside of the wall respectively forming the recesses. The use of a shaping insert affords the possible option of applying labeling or identification to the surface of the spherical rissoles or burgers prepared in the insertion cassette. The shaping inserts used can have the most widely varying characters or digits for representing for example the names of manufacturers or trademarks. The preferably metallic shaping insert produces enhanced browning on the surface of the burger or rissole to be prepared, which can thus be clearly seen. The shaping insert preferably has a circular shaping portion which on its front side towards the accommodating chamber has one or more characters. In a further configuration the shaping insert on the rear side which is towards the wall of the recess has one or more push-in or clamping elements for arresting the shaping insert in the recess. The push-in or clamping elements are of a complimentary configuration to one or more apertures in the wall of the recess, thereby providing a secure hold by for example a force-locking connection or a positively locking connection. The shaping inserts are preferably provided interchangeably at the casing portions of the insertion cassette.

In a configuration of the invention the casing portions of the insertion cassette have preferably outwardly projecting abutment elements which are adapted to hold the casing portions which are brought into contact with each other at a spacing and to be received in a guide of the accommodating compartment. The abutment elements are preferably provided or arranged on surface regions of the casing portions, that are preferably opposite to the connecting region of the casing portions at the bottom of the insertion cassette. The pivotal movement of the casing portions which are preferably in the form of half-shell portions, is limited by the abutment elements in the closing movement. The abutment elements are for example strip-shaped angled edge parts of the casing portions, which project at a right angle outwardly at a respectively associated wall region of a respective casing portion. In addition, the abutment elements are guided in a guide preferably in the form of a recess at the upper horizontally extending wall of the accommodating compartment. Guidance in the groove-like recess provides that the casing portions are in a predetermined orientation while the insertion cassette is inserted into, remains in and is removed from the accommodating compartment and the heating device.

Another development of the apparatus according to the invention provides that the insertion cassette has a handle comprising a preferably insulating material. By way of the handle arranged on the insertion cassette, they can each be securely and safely fitted into and removed from the accommodating cassette without the risk of the operator possibly suffering injury thereby. The handle is preferably made of a heat-insulating material like for example plastic or a wood material. The handle is connected to the insertion cassette by way of a handle carrier which protrudes or extends outwardly at the outer casing of the insertion cassette. Preferably, when the insertion cassette is fitted into the accommodating compartment of the apparatus according to the invention, the handle is oriented vertically whereby it is possible to securely grip the handle.

In another configuration of the invention the handle is preferably arranged rotatably on a handle carrier of a first casing portion and is adapted to be brought into a locking position or a release position with its locking portion with a projection on the handle carrier of the second casing portion by rotation. By means of the handle which is rotatable about its longitudinal axis on a casing portion it is possible to ensure a closing function on the insertion cassette. Preferably the axis of rotation is oriented parallel to the plane of separation of the casing portions which can be fixed together. By rotating the handle through a quarter to about half a revolution it is moved from its release position into the locking position. That prevents the insertion cassette casing portions which are pivotably connected together from being accidentally or unintentionally pivoted open, in particular during handling of the insertion cassette and preferably prior to insertion thereof into the accommodating compartment and after removal thereof from the compartment, as from the moment at which there is no longer guidance in respect of the abutment elements. According to an alternative configuration the handle is preferably of a two-part structure, wherein each handle portion constituting the handle is connected by way of a handle carrier to a casing portion of the insertion cassette. The closing function is then implemented by gripping the two handle portions. Instead of the handle being of a two-part structure it is also possible to provide on the insertion cassette a locking means which is to be actuated separately and which preferably couples the casing portions together at the side in opposite relationship to the hinge.

Preferably the heating device has heating elements oriented parallel to the side walls of the insertion cassettes. The heating elements preferably generate infrared radiation which acts both on the side walls of the insertion cassettes and also directly on the meat product accommodated in the accommodating chamber of the insertion cassettes, by virtue of the apertures through the side walls, and thus warms or heats same. The heating elements are arranged within the accommodating compartment at a relatively small spacing of for example between 5 mm and 1 cm relative to the side walls of the insertion cassette. The heating device is preferably an electrical resistance heating means with heating coils wound on ceramic plates as the heating elements. The surface of the meat product is in contact on the inside of the insertion cassette with the side walls whereby a grill pattern is produced on the surface of the meat products to be prepared, by means of the heated side walls of the insertion cassette.

Preferably the insertion cassette is made from a metallic material. The use of a metallic material for making the insertion cassette permits manufacture of the cassettes by means of simple manufacturing processes like for example stamping or shaping pressing. The material used is for example stainless steels or sheets which are provided with a preferably corrosion-resistant coating. It is further provided that the lowermost insertion compartment at the bottom region of the insertion cassette has a bottom surface which is angled substantially relative to the middle or the ends of the bottom of the cassette. Liquid which issues or condenses at the meat products during their preparation like fat or condensate passes on to the bottom of the accommodating chamber and is carried away in specifically targeted fashion by way of the cassette bottom. For that purpose the insertion cassette can be provided with apertures in the bottom region for specifically carrying away liquid occurring in the insertion cassette.

In another development there is provided a catch container extending horizontally beneath the accommodating device. By means of the catch container beneath the accommodating device, also referred to as the grill device according to the invention, liquids which occur in preparation of the meat products are simply and reliably caught. That can counteract soiling and contamination of the apparatus according to the invention. Preferably the accommodating compartments for the insertion cassettes are provided in the bottom region with outlets which ensure access to the catch container disposed beneath the accommodating device. The surfaces, forming the outlets, in the bottom region of a respective accommodating compartment have a preferred discharge flow direction for the liquids produced in preparation of the meat products, which further simplifies discharge of the liquids in the direction of the preferably trough-like catch container. The catch container has a preferably flat bottom and container walls extending perpendicularly thereto.

According to a development of the invention the heating device is coupled in signal-conducting relationship to a preferably electronic control unit for controlling the cooking temperature and/or cooking time. It is possible in that way to exert a specifically targeted influence on the cooking temperature in the accommodating compartments and the cooking time, in dependence on the meat products to be prepared. Preferably the control unit is adapted to individually actuate the heating element for the different accommodating compartments. In that way it is possible for different meat products which have to be prepared at different cooking temperatures to be prepared in adjacent accommodating compartments at the same time. In addition, the insulation between the accommodating compartments ensures that any adverse effect on temperature as between adjacent accommodating compartments and the foodstuffs being prepared therein is avoided.

According to a particularly preferred embodiment of the invention which at the same time also represents a separate aspect of the invention the apparatus according to the invention is distinguished by a hot air preparation device for foodstuffs. The invention is based on the realization that, by means of a hot air preparation device associated with the accommodating device for the meat products, that is in the form of a grill or cooking device, it is possible to prepare foodstuffs which otherwise are usually prepared in fryers using large amounts of oil or fat. The use of a hot air preparation device, besides the grill or cooking device on the apparatus according to the invention, permits quick, careful and in particular low-fat preparation of the most widely varying foodstuffs. That advantageously further simplifies the preparation of meals in the field of fast-food restaurants and snack bars and take-aways. In addition, an energy saving is possible by means of the apparatus according to the invention as the cooking device and also the hot air preparation device are respectively switched on as required and are already ready for operation after a very short time. There is no need in the present case to previously maintain given temperatures at the grill or cooking devices.

Preferably the hot air preparation device has a fan and a heating unit, wherein the heating unit is arranged in the air flow which is produced by the fan and which is at least portion-wise guided within the appliance housing. Simple and at the same time energy-efficient heating of the air flow guided within the appliance housing is ensured by means of the heating unit in the air flow. Preferably, during preparation of the foodstuff in the hot air preparation device, at least during pre-heating and also during preparation of the foodstuff itself, a closed circuit is produced in which and along which the hot air flow which is to be heated or which has already been heated is guided. That ensures that fresh cold air which has been introduced into the appliance housing does not have to be continuously heated for preparation of the foodstuff in the hot air preparation device. After reaching the temperature intended for preparation of the foodstuff, the heating unit can be at least temporarily switched off, by virtue of the air flow being circulated. That further improves the level of efficiency in preparation of the foodstuff and the energy requirement of the apparatus according to the invention is markedly reduced. The necessary air flow which preferably continuously acts on the foodstuff to be prepared can be produced with the fan, in which respect preferably an axial or radial fan is used.

Another development of the invention provides that that the hot air preparation device includes a chamber and one or more drums which can preferably be rotatably received in the hot air flow, which is adapted to expose foodstuffs in the drum uniformly to the hot air flow flowing through the chamber. Preferably the hot air preparation device has a closed or closable chamber, within which a drum which can be loaded with the foodstuff to be prepared is arranged rotatably at least during the foodstuff preparation phase. A movement of the foodstuff within the drum is produced by way of drum rotation, similar to a movement in the washing process in the drum of a washing machine. The rotary movement of the drum provides that the foodstuff which is composed in particular of a large number of individual items is uniformly exposed to the hot air flow produced. In that way the heating operation can be carried out more effectively and at the same time in a shorter time, in comparison with a foodstuff which is immovably subjected to the action of hot air. Preferably the drum moves within the chamber continuously or constantly during the operation of heating the foodstuff to be prepared.

In a configuration of the invention the drum has a preferably cylindrical accommodating chamber for the foodstuffs and is provided with a central opening for the introduction of hot air at preferably an end wall. The rotational movement of the drum can be easily implemented within the chamber due to the cylindrical configuration of the drum. The chamber is preferably also of a cylindrical configuration or shape, wherein the inside diameter of the chamber is only slightly larger than the outside diameter of the drum. The term slightly larger is used here to mean dimensions in the range of between 2 and 10 mm. The hot air is introduced into the drum interior by means of the central opening of the drum, which is preferably provided at a flat circular end wall. A concentric feed of the hot air produced into the drum interior is ensured by way of the central opening. The central opening is preferably of a diameter which approximately corresponds to a quarter to about a third of the drum diameter. That provides a correspondingly high throughflow rate for the hot air through the drum and a high level of heat input into the drum.

In another development of the invention the drum has an end region which is arranged opposite to the end wall with the central opening, the end region having outlets preferably arranged at the periphery. By means of the outlets arranged opposite to the central opening, this arrangement provides that the interior of the drum has the hot air flow passing therethrough in the best possible way in the longitudinal direction of the drum. The specifically adopted arrangement of inlet and outlet at opposite end regions of the drum avoids drum portions or regions which do not have the hot air flow passing therethrough. The outlets are preferably distributed uniformly over the end peripheral region of the drum. Preferably the plurality of outlets constitute an outlet region extending over the entire periphery of the drum. The outlets are in the shape of a slot extending in the longitudinal direction of the drum and are respectively arranged in directly mutually adjacent relationship. Provided between two adjacent outlets is a limb which is only a fraction of the width, as the width of the outlet in the peripheral direction.

In another configuration of the invention the drum has a stationary spiral member extending in a spiral form along its inside peripheral surface for circulating the foodstuffs accommodated in the drum or includes an accommodating basket displaceable in the drum and having one or more accommodating compartments arranged distributed along the basket periphery for accommodating the foodstuffs. The spiral member improves the uniform movement of the foodstuff which involves a large number of piece items, like for example French fries. Upon rotation of the drum, the foodstuffs bearing directly against the drum wall are held at least somewhat thereagainst and also move therewith over a predetermined rotary angle. The spiral member prevents the foodstuff from sliding along the drum wall in the peripheral direction and provides a uniform mixing effect. Accordingly for example each individual item comes into contact with the hot air flow to the same degree as any other individual item. The spiral member is preferably made from a strip-shaped sheet metal body. Preferably the outside edge of the spiral member is connected to the inside of the drum by a connection involving intimate joining of the materials, being in particular welded to the drum inside. In the other alternative configuration of the invention in which there is a accommodating basket disposed displaceably in the drum, the foodstuffs to be prepared like for example cooking or boiling sausages are preferably held in a fixed orientation relative to the central axis of the drum and move in a controlled fashion within the hot air preparation device. The accommodating basket can preferably be removed from the drum and fitted into same again and fixed thereto. Preferably a hot vapor flow is generated within the hot air preparation device by the addition of moisture to the hot air flow. The hot air preparation device thus performs the function of a boiling unit for the foodstuffs arranged in the accommodating compartments of the basket. In addition this ensures that the foodstuffs are cooked in a careful fashion without drying them out.

Preferably the hot air flow loaded with moisture is cooled down before issuing from the apparatus according to the invention, in which case a large part of the moisture condenses out. The condensed liquid is preferably re-used for moisturizing the hot air flow.

Preferably the wall regions of the accommodating compartments for the foodstuffs are perforated at the accommodating basket or have one or more apertures. The outsides of the foodstuffs disposed in the accommodating compartments come into contact over a large surface area with the hot vapor flowing through the chamber of the hot air preparation device, by way of the apertures in the wall surfaces of the accommodating compartments. In addition uniform heating is ensured over preferably the entire surface area and thus shortened foodstuff preparation times are also guaranteed.

Preferably the drum can be reversibly coupled and uncoupled with a holding means mounted rotatably in the chamber, wherein the holding means is rotationally drivingly coupled to a drive means. Coupling and uncoupling which can be repeated as often as may be desired is possible between the drum and the holding means so that the drum can preferably be removed from the chamber of the hot air preparation device according to the invention and fitted into same again. The holding means preferably has a receiving portion which corresponds to an end region of the drum and at which the drum is temporarily fixed during respective preparation of the foodstuff in the drum. The receiving portion is preferably a rotational body of an outside periphery similar to the diameter of the drum. The holding means for the drum is preferably connected mechanically to a drive means to transmit a rotary movement. A coupling gear serving as a transmission arrangement is preferably provided between the drive means and the receiving portion which holds the drum. The drive means is preferably an electric motor with which the required rotary movement for the drum can be produced in a simple fashion. In the region of its outside diameter, the receiving portion which is carried rotatably about its axis of rotation has an external tooth arrangement meshing with a drive pinion coupled to the drive shaft of the drive means. The rotary speed of the drum in the present case is approximately between two and three revolutions per minute. Rotary speeds of four, five or more revolutions per minute are also possible.

In addition at the outside of the end wall preferably having the central opening the drum has a plurality of locking portions which correspond to latching elements of the holding means, which latching elements project in the axial and/or radial direction into the chamber. The locking portions on the drum, which project in the direction of the holding means at the rear-side end wall of the drum, and the latching elements, easily permit the making of a connection which can be reversibly coupled and uncoupled as often as may be desired, similarly to a bayonet connection. Locking portions and latching elements correspondingly engage into each other in such a way that the drum is rotationally fixedly connected in one direction of rotation to the receiving portion while release of the connection occurs in the opposite direction. The rotationally fixed connection between the drum and the receiving portion is produced in that case by a movement of the drum in opposition to the currently prevailing drive direction of the drive driving the drum. Upon a movement of the drum in the direction of the rotary movement of the drive means, the connection between the locking elements on the drum and the latching elements on the receiving portion is disengaged. Preferably a plurality of and preferably three locking portions are arranged on a pitch circle diameter near the outer periphery of the drum at a uniform spacing relative to each other, thereby ensuring reliable torque transmission.

Preferably in the region of its peripheral portion the drum has a filling and removal opening which preferably extends over more than half the drum length and over an angle of about ⅕th of the overall periphery of the drum. To be able to introduce the foodstuffs to be prepared into the drum and to remove them again a filling and removal opening is provided in the region of the peripheral portion of the drum. The opening at the drum periphery permits easy loading and easy removal of the foodstuffs after preparation has been effected. Preferably the filling and removal opening extends over at least half the drum length, preferably over about three quarters of the drum length. The size of the opening in the peripheral direction is approximately between a sixth and a quarter of the overall periphery of the drum, preferably about a fifth of the overall periphery, which corresponds to about 75°. The filling opening can be equipped with a cover for closing the filling and removal opening.

Preferably the drum has a preferably transparent cover which covers the opening of the chamber in the appliance housing and which is rigidly connected to the peripheral portion of the drum. Instead of a chamber cover arranged pivotably at the front side of the appliance housing the apparatus according to the invention has a cover directly fixedly connected to the drum peripheral portion. Thus in operation of the hot air preparation device the cover performs a rotary movement together with the drum. In addition it can be seen in an advantageously simple fashion whether the hot air preparation device is still in operation or whether the preparation phase of the foodstuff in the drum is concluded.

In another configuration of the invention which includes a hot air preparation device in the form of a boiling unit, the cover for covering the opening on the appliance housing is fixedly connected to the accommodating basket. The accommodating basket is adapted to be removable from the drum and to be fitted into the drum again, wherein the drum preferably completely covers an end of the drum. The accommodating compartments of the accommodating basket extend substantially perpendicularly to the plane of the cover. The cover is preferably connected releasably to the drum which can be removed from the chamber of the hot air preparation device.

In addition there is preferably provided on the cover a gripping portion for reversibly coupling and uncoupling the drum by hand to and from the holding means in the chamber of the hot air preparation device according to the invention. By means of the gripping portion disposed on the cover, the drum is released from the receiving portion and the drum is removed from the chamber in order for example to load the drum with a portion of a foodstuff to be prepared like for example French fries. After the drum has been filled the drum is then pushed into the chamber by way of the gripping portion and the drum is coupled to the receiving portion of the holding means again by rotation of the drum in opposite relationship to the usual drive direction within the chamber. When coupling the drum to the receiving portion the locking elements of the drum are latched to the latching elements on the receiving portion of the holding means. The cover which closes the drum at the front side is preferably equipped with a double glazing which has an insulating effect.

In order to prevent individual pieces of the foodstuff passing between the outside of the drum and the inside of the chamber in preparation of the foodstuff in the rotating drum, a configuration of the invention provides that the spacing is less than a millimeter. An alternative configuration of the invention provides that a sealing means is arranged along the removal opening, which sealing means comes into contact with the inside of the chamber after insertion and preferably completely seals off the gap. A further alternative configuration provides for the use of a cover which can be fitted and removed to close the filling and removal opening.

In another configuration of the apparatus according to the invention the rotatable drum has one or more sealing portions which can be brought into sealing contact with the chamber rear wall or the hot air inlet and/or the cover of the drum has sealing portions which can be brought into sealing contact with the outside of the appliance housing front of the appliance housing. Preferably a labyrinth seal is provided at both ends of the drum. The labyrinth seal prevents the hot air flow passing through the drum from following an unwanted path within the appliance housing or issuing from the appliance housing at wall regions which are not intended for that purpose. The sealing members which can typically be for example rubber seals counteract unwanted discharge of the hot air and possibly odor particles or mist entrained therewith at the opening of the chamber. Therefore the hot air preparation device according to the invention permits preparation of foodstuffs, which in the preparation of foodstuffs causes a markedly reduced odor emission.

In accordance with another configuration of the apparatus according to the invention in the bottom region the chamber has a receiving reservoir removable from the chamber for receiving liquid residues. Preferably vapors or liquids which are produced in the production or preparation of the foodstuffs in the interior of the chamber and which are deposited at the inside of the chamber are caught by way of the receiving reservoir in the bottom region. The receiving reservoir is for example in the form of a channel-like depression in the bottom region of the chamber. Preferably the receiving reservoir is covered with a cover which is permeable for liquids. A configuration of the invention provides that the receiving reservoir includes a catch pan which is removable from the chamber.

Preferably the chamber has an inside wall with a cleaning-facilitating surface. That ensures that residues clinging to the inside wall resulting from a previous preparation operation can be easily removed from the inside wall of the chamber. The inside wall of the chamber can be provided for example with a coating which for example makes cleaning easier or which basically makes it more difficult for fouling and contamination to cling to the wall. Optionally it is provided that the drum has a cleaning-facilitating surface on the inside which receives the accommodating chamber for the foodstuffs and also on the outside that is towards the chamber wall.

A further configuration of the apparatus according to the invention provides that the hot air preparation device has a feed unit for adding liquid preferably in drop form to the hot air flow. By means of the device connected to the hot air flow additive substances like for example fat or oil can be introduced into the hot air flow guided through the appliance housing, which substances promote or accelerate the process for preparation of the foodstuff in the drum. The feed unit preferably has a metering pump coupled in fluid-conducting relationship to a collecting container from which the liquid to be added thereto is sucked. The metering pump preferably passes the liquid into the hot air flow in dependence on the composition of the hot air flow, which is measured or detected for example within the drum. In another embodiment of the invention, instead of small amounts of fat or oil, water is introduced into the hot air flow. Particularly in the case of a hot air preparation device in the form of a boiling unit, that provides a reduced preparation time for the foodstuffs to be prepared, like for example cooking or boiling sausages. Preferably the addition of water to the hot air occurs continuously. The hot air which is in the form of hot water vapor is preferably cooled down before being discharged from the appliance housing. That provides that a large part of the moisture contained in the hot air flow condenses out and does not pass into the environment.

Preferably the condensate is caught and fed to the feed unit for the water for renewed addition to the hot air flow.

A development of the apparatus according to the invention is distinguished by a passage which connects the hot air preparation device to the accommodating device for the meat products and which preferably carries a partial amount of the hot air flow. In an optional configuration of the invention the hot air flow produced within the hot air preparation device is used to heat the accommodating device for the meat products to be cooked, also referred to as the grill device, or to additionally pass at least a part of the hot air produced by the hot air preparation device into the grill device during the cooking operation. In addition more uniform incrustation of the surfaces of the meat products is achieved in the grill device. The surface also acquires a faster browning shade due to the hot air which is directed on to the meat products. In order to be able to pass at least a part of the hot air flow from the hot air preparation device into the accommodating device, also referred to as the grill device, for the meat products, the apparatus according to the invention has a passage which connects both components together. The transfer passage can preferably be opened and closed in specifically targeted fashion so that the hot air can be transferred into the accommodating device for the meat products according to the requirements involved.

The hot air preparation device is coupled in signal-conducting relationship to a preferably electronic control unit for controlling the temperature and/or the preparation time. Preferably regulation of the temperature within the chamber accommodating the drum and regulation of the preparation time of the foodstuff to be prepared in the drum is effected by means of the control unit. At the same time, control of the rotary movement of the drive means for the drum is also effected with the electronic control unit. In that way it is possible for starting and/or stopping of the drum to be controlled in specifically targeted fashion at a predetermined rotary angle in the chamber. The drive means which preferably comprises a stepping motor is driven in controlled fashion in such a way that the drum is stopped so that the filling and removal opening at the periphery of the drum is approximately a quarter revolution before reaching its uppermost position. By rotating the drum by hand by means of the gripping portion, the connection between the drum and the receiving portion is released and at the same time the filling and removal opening is moved into the upper position of the chamber. The drum can now be removed without the danger of the foodstuff which has already been prepared in the drum accidentally falling out through the opening which now faces upwardly. An alternative configuration of the invention provides that the hot air preparation device and the accommodating device for the meat products, also referred to as the grill device, each have a respective electronic control unit. A preferred configuration however provides that the grill device and the hot air preparation device are controlled by way of a joint electronic control unit.

The control unit is preferably connected in signal-conducting relationship to sensor means for detecting the temperature in the accommodating device for the meat products and/or the hot air preparation device and/or to optical and/or acoustic signal generators for the output of information signals. Relevant condition parameters which apply for preparation in the grill device for the meat products and in the hot air preparation device, like for example the temperature or the composition in the hot air, can be monitored and regulated by means of the sensor means. It is equally possible to monitor and regulate the open or closed position of possible flaps in the passage for the hot air flow which is passed through the appliance housing. Temperature sensors, pressure sensors or moisture sensors or limit position switches are used for example as the sensor means. For example the fact of exceeding presettable temperature limit values or also the attainment of the presettable cooking time can be displayed by means of optical and/or acoustic signal generators. For example lighting means or loudspeakers are used as optical or acoustic signal generators.

According to a configuration of the apparatus according to the invention it is distinguished by a discharge air filter unit by way of which the air flow passed through the appliance housing is passed, which is preferably arranged downstream of the accommodating device for the meat products. The discharge air filter unit prevents moisture or odor particles entrained with the hot air flow from passing into the environment. The filter unit is preferably arranged upstream of an outlet for the hot air flow which is passed through the appliance housing. The odor content produced by the apparatus according to the invention can be reduced to a minimum by the filter unit, whereby use in fast-food restaurants and snack bars is possible without any problems. The filter unit has one or more filter elements containing activated carbon and other filter substances. The filter unit is preferably adapted to absorb a large part of the odor emission from the cooking processes performed by means of the apparatus according to the invention from the grill device and the hot air preparation device.

Preferably the filter unit is arranged at an outlet opening at the outside of the appliance housing, the filter unit having an interchangeable filter element. A discharge air filter unit arranged at the outside of the appliance housing permits simplified access to the filter system and thus a simple change of the filter element without having to remove regions of the appliance housing. Associated with the outlet opening on the appliance housing is a frame-like push-in receiving means, into which the filter element can be pushed in sealing relationship with the outside of the appliance housing and from which it can be removed again. The use of a filter element which preferably has activated carbon ensures binding of odor substances or particles which are entrained by the air flow. Preferably the filter elements can be aromatized or provided with fragrances.

An alternative configuration provides that arranged downstream of the filter unit in the discharge air flow direction is an air passage into which fragrance pads provided separately from the filter element can be fitted. The fragrance pads and the filter elements can thus be replaced independently of each other.

An optional configuration of the invention provides that a boiling sausage heater is additionally arranged on the top of the appliance. Preferably the boiling sausage heater uses the waste heat from the grill device and the hot air preparation device. The boiling sausage heater has a heat-resistant container, for example of glass, with a cover which can be opened and closed at the top side of the container. Disposed in the container is a supply vessel having an amount of water which is heated by the waste heat delivered to the container and in addition the water in the pan is heated to a temperature of preferably between 70° and 90° C. A grid for boiling sausages which can be accommodated thereover is arranged above the pan. The water vapor rising from the supply vessel provides for heating the boiling sausages disposed thereabove and which can be held ready for consumption over several hours by contact with exclusively the water vapor.

In a particularly preferred embodiment of the present invention which at the same time also represents a separate aspect of the invention the apparatus according to the invention for heating and/or cooking foodstuffs is distinguished by a cooling device for in particular foodstuffs which are still to be prepared. The invention is based on the realization that, by means of a cooling device provided in the apparatus, foodstuffs which have not yet been prepared can be put into intermediate storage in a simple fashion. Preferably the cooling device has a cooling unit with which the cooling chamber which is otherwise used for passing a hot air flow therethrough can be set to a predetermined cooling temperature. The cooling unit used can be for example a Pelletier element which involves a low power consumption and which in particular is suitable for keeping products which have already been pre-cooled to a predetermined cooling temperature in energy-efficient fashion. Such a Pelletier element also takes up a small amount of space within the appliance housing of the apparatus according to the invention.

The cooling device includes an accommodating compartment for the foodstuff products which are to be kept cool, which compartment can be fitted into and removed again from the cooling chamber on the appliance housing. Preferably the cooling chamber is arranged in the appliance housing beneath the grill device with its insertion cassettes which can be inserted into two accommodating compartments on the appliance housing. The cooling chamber and the accommodating compartment which can be fitted into the chamber are preferably cylindrical in shape. The accommodating compartment has a filling and removal opening for the foodstuffs to be kept cool, almost over its entire length and over approximately an angular amount of about ⅓rd of the overall periphery. A cover for closing the opening of the cooling chamber on the appliance housing is arranged at the same time on the accommodating compartment of the cooling device.

BRIEF DESCRIPTION OF THE DRAWINGS

The invention is described in greater detail hereinafter by means of a preferred embodiment by way of example with reference to the accompanying Figures in which.

DETAILED DESCRIPTION

Figure 1:
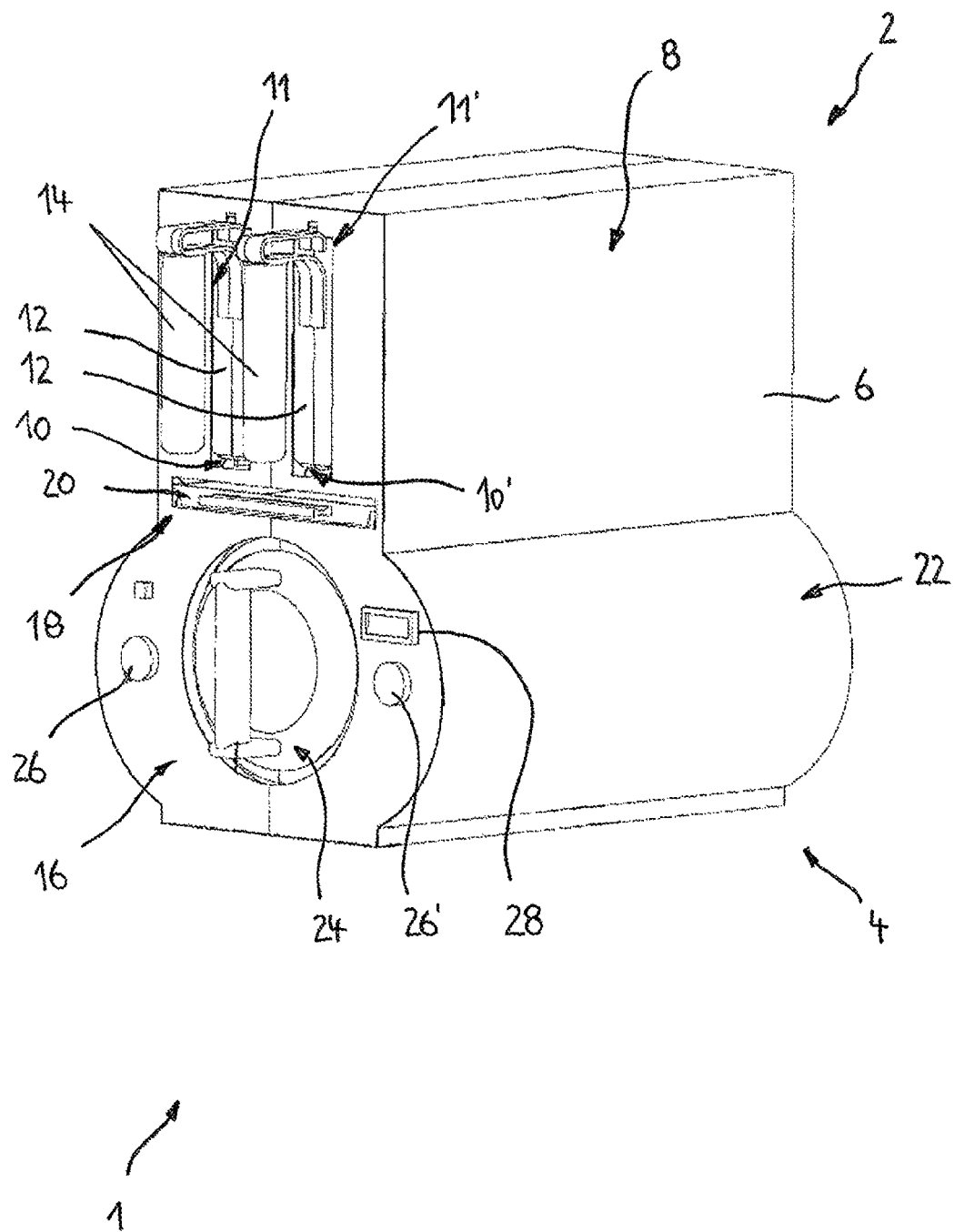
FIG. 1 shows a perspective view of the apparatus according to the invention.

FIG. 1 shows an apparatus 1 for heating and/or cooking foodstuffs, which has an accommodating device 2, in particular for meat products, and a hot air preparation device 4 for foodstuffs, like for example French fries. The apparatus according to the invention is in the form of a combination appliance which includes an appliance housing 6 in which the accommodating device 2 and the hot air preparation device 4 are arranged in integrated fashion.

Figure 2:
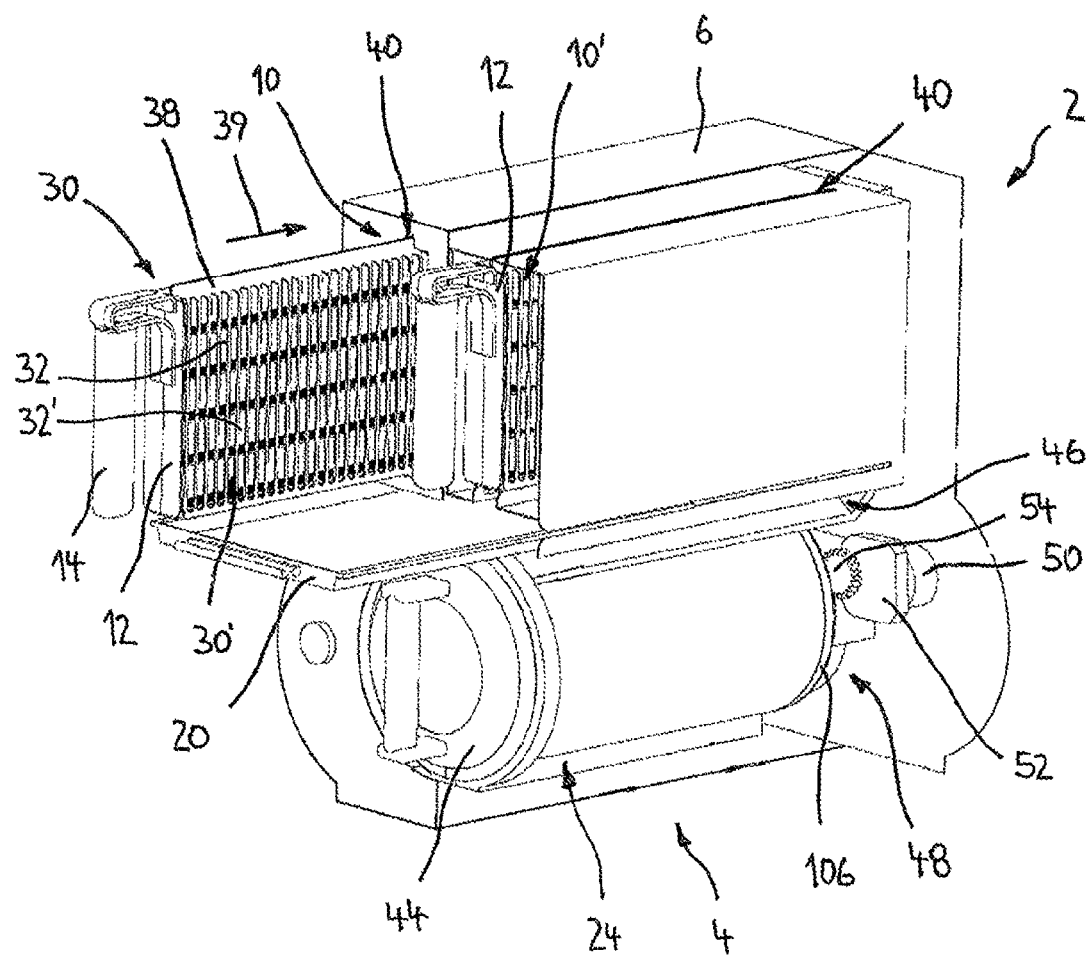
FIG. 2 shows a perspective view in partial section of the apparatus of FIG. 1.

The accommodating device 2, also referred to as and in the form of a grill device 2, is arranged in the present embodiment above the hot air preparation device 4. The grill device 2 which is arranged in the upper cuboidal portion 8 of the appliance housing 6 has two accommodating compartments 10, 10' accessible by way of openings 11, 11' in the appliance housing 6. The accommodating device 2 for the meat products, hereinafter referred to as the grill device 2, is adapted to accommodate two insertion cassettes 12, 12' which in the present embodiment are fitted into the accommodating compartments 10, 10'. For handling the insertion cassettes 12, 12' they each have a respective handle 14 projecting at the appliance housing front 16. Provided beneath the grill device 2 is an insertion slot 18 for a catch container 20 which extends in the horizontal direction and by way of which liquids which are produced or occur upon heating and/or cooking of the meat products in the grill device 2 are caught. Arranged in the lower substantially cylindrical portion 22 of the appliance housing 6 is the hot air preparation device 4 having a rotatably mounted drum 24 (FIG. 2). In addition operating and regulating elements 26, 26' and a digital display device 28 are provided at the appliance housing front 16.

As FIG. 2 clearly shows the accommodating compartments 10, 10' are spatially separated from each other, wherein insulation (not shown) is provided in the separating regions. That avoids transfer of heat from one accommodating compartment 10 to the adjacent compartment 10'. The insertion cassettes 12, 12' have an outer casing 29 with vertically extending side walls 30, 30' provided with a plurality of apertures 32, 32'. By way of the apertures 32, 32' the heat generated by a heating device 34 (FIG. 3) of the grill device 2 can act directly on the meat products 36 (FIG. 5) which are disposed in or placed in the insertion cassettes 12, 12'. Preferably the insertion cassettes 12, 12' are pushed into and pulled out of a respective accommodating compartment 10, 10'. The insertion cassettes 12, 12' have abutment elements 38 guided in a guide 40 extending parallel to the insertion direction 39 of the insertion cassettes 12, 12'.

The rotatably mounted drum 24 is rotatably accommodated in a substantially cylindrical chamber 42 (FIG. 6), the drum 24 having a cover 44 which sealingly closes the opening 43 of the chamber 42 in the appliance housing 6 and which is fixedly connected to or is part of the drum 24. The hot air flow produced by means of the hot air preparation device 4 is passed out of the chamber 42 by way of a discharge air passage 46 in the direction of the grill device 2, by means of which the grill device is preheated, or the foodstuffs prepared with the grill device 2 are additionally subjected to the effect of the hot air flow. The rotary drum 24 can be reversibly coupled and uncoupled with its rearward end to a holding means 48. The holding means 48 is rotatably mounted and connected to a drive means 50 to transmit a rotary movement. The drive means 50 is coupled by way of a coupling gear 52 and a drive pinion 54 to a receiving portion 106 of the holding means 48.

Figure 3:
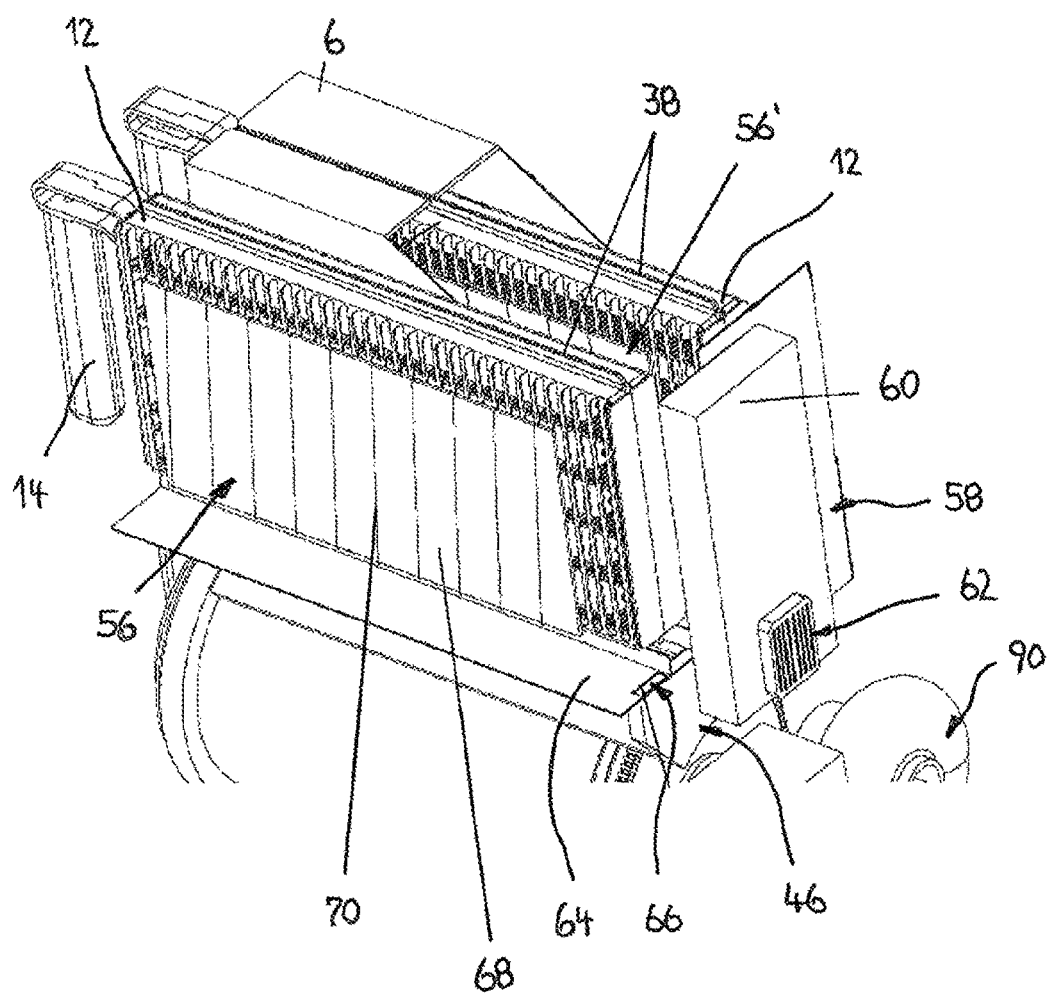
FIG. 3 shows a perspective view of part of the grill device according to the invention.

FIG. 3 shows the grill device 2 without the appliance housing 6 concealing the accommodating compartments 10, 10', in which respect it will be seen that the heating device 34 has a plurality of heating elements 56, 56' in the form of plate heating bodies. For each accommodating compartment 10, 10' two heating elements 56, 56' extend parallel to the side walls 30, 30' of the insertion cassettes 12, 12'. Arranged at the rear side of the grill device 2 is a discharge air filter unit 58 having a filter element 60 and an outlet opening 62. The filter unit 58 is disposed upstream of the outlet opening 62. Possible odors or vapors occurring within the hot air preparation device 4 and in the grill device 2 are filtered out of the hot air flow passed through the apparatus 1 by means of the filter unit 58. The air flow leaving the apparatus is thus almost free of odor substances. For the transfer of air between the hot air preparation device and the grill device the apparatus 1, beneath the grill device 2, has a bottom plate 64 with blowing-in openings 66. The heating elements 56, 56' in the form of plate bodies comprise a carrier plate 68 of ceramic and a resistance wire 70 which in the present structure is wound in a spiral form around the carrier plate 68.

Figure 4:
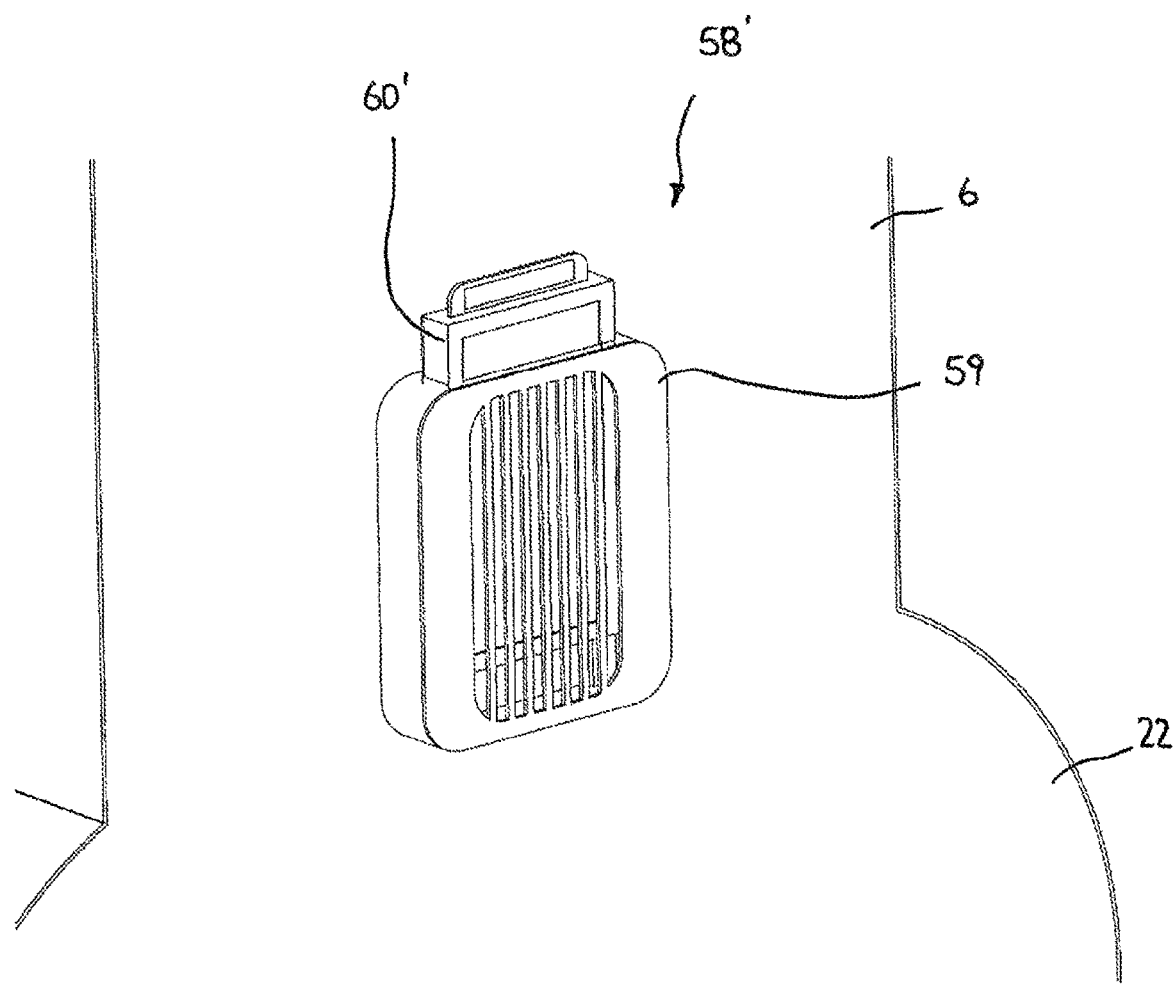
FIG. 4 shows a perspective view of part of an alternative configuration of a discharge air filter unit.

FIG. 4 shows the apparatus 1 with a discharge air filter unit 58' of an alternative configuration, which is arranged on the outside of the appliance housing 6. The discharge air filter unit 58' has a frame-like push-in receiving means 59 which is associated with the outlet opening 62, shown in FIG. 3, of the discharge air flow, in such a way that the outlet opening 62 is completely covered. For example a filter element 60' having an activated carbon filter can be pushed into the push-in receiving means 59. Odor substances and particles entrained in the discharge air flow are correspondingly filtered out.

Figure 5:
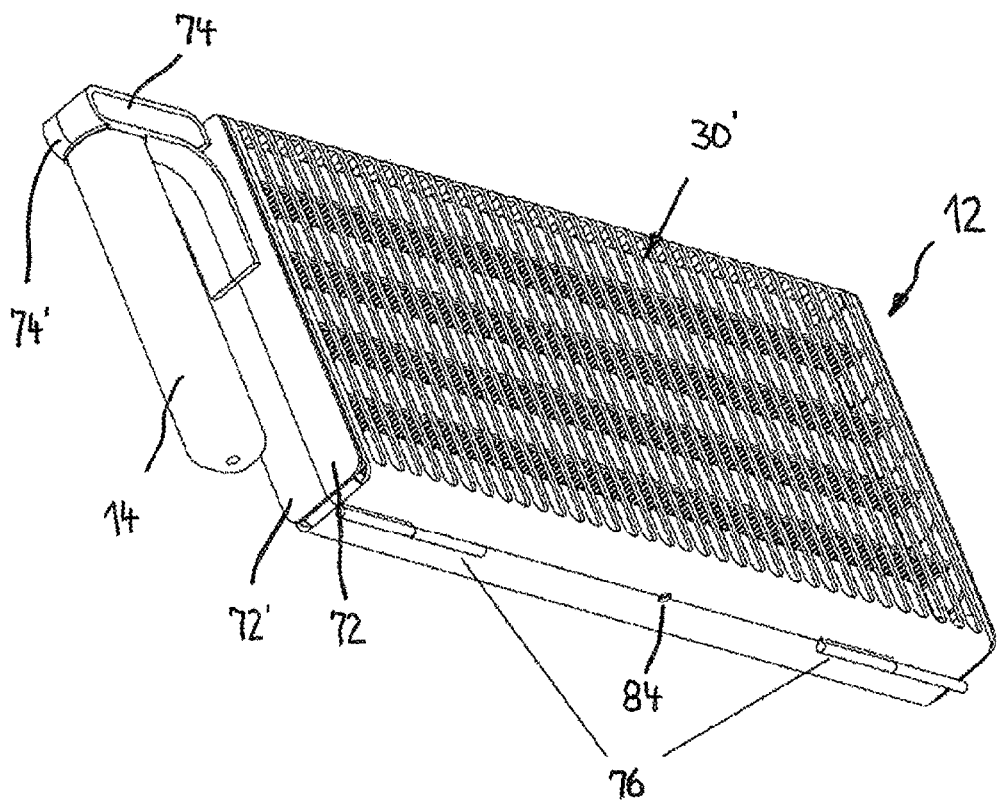
FIGS. 5 and 6 show perspective views of the insertion cassette according to the invention in the closed and opened conditions.
Figure 6:
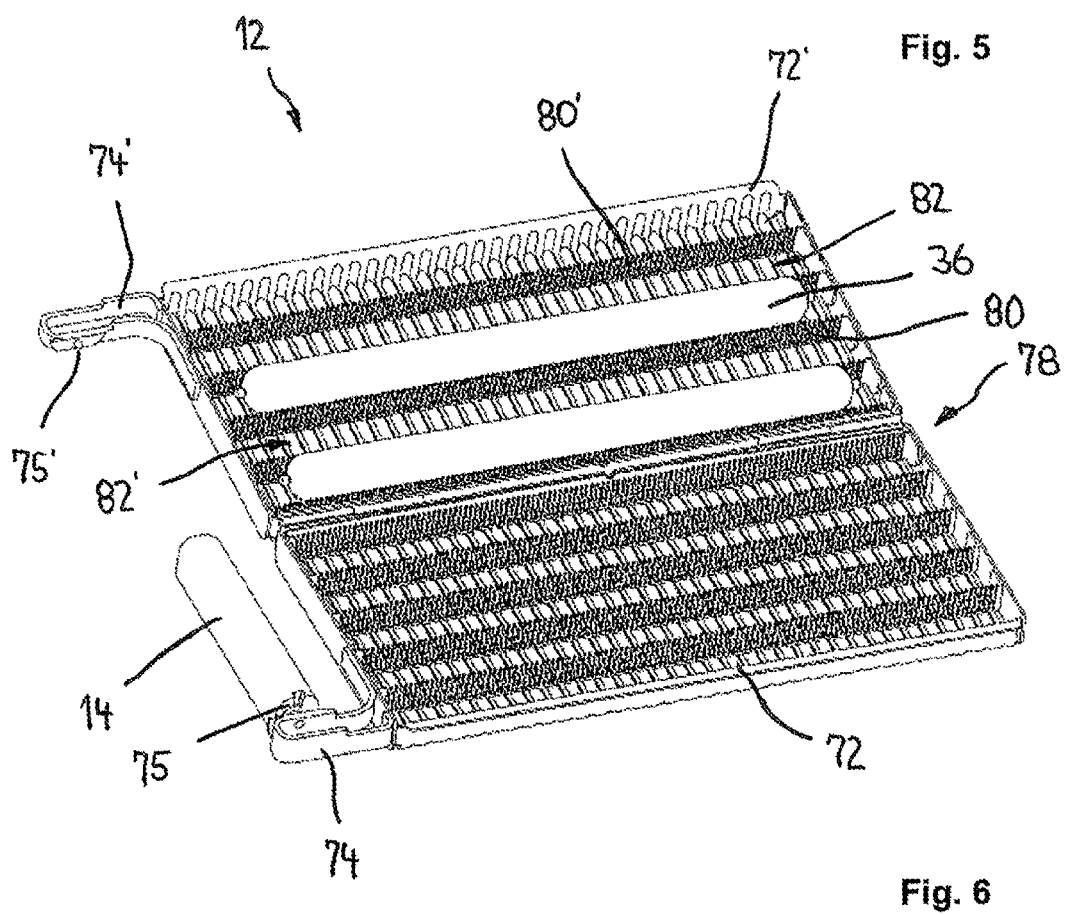

FIGS. 5 and 6 shows the insertion cassette 12 and are intended to clearly show the structure thereof. The insertion cassette 12' has an outer casing 29 comprising two casing portions 72, 72' which are pivotably moveably connected together. Arranged on the outer casing 29 is a two-part handle carrier 74, 74', wherein each casing portion 72, 72' is connected to a part of the handle carrier 74, 74'. Arranged rotatably on the handle carrier part 74 is the handle 14 which depending on the rotary position thereof is in a release position or a locking position and thus allows or prevents the two casing portions 72, 72' of the insertion cassettes from pivoting apart. The handle 14 on the handle carrier part 74 is carried rotatably in particular about an axis of rotation arranged parallel to the plane of separation of the casing portions 72, 72'. In the locking position the handle 14 is operatively connected in holding relationship with its locking portion 75, to a projection 75' on the handle carrier part 74'. The casing portions 72, 72' are hingedly connected together by way of two hinges 76 arranged in the bottom region of the insertion cassette 12. The casing portions 72, 72' of the insertion cassette 12 can be pivoted relative to each other through an angle of about 180° by means of the hinges 76. The side walls 30, 30' are of a grid-like configuration in the illustrated embodiment. The casing portions 72, 72' have limbs 80, 80' on the inside for subdividing the accommodating chamber 78 for the meat products 36. Insert compartments 82, 82' are formed by means of the limbs 80, 80' which project approximately perpendicularly at the inside of the side walls 30, 30' and which preferably extend parallel to the bottom region. In addition the meat products 36 to be cooked are disposed in a predetermined orientation within the insertion cassette 12, 12' by virtue of the insert compartments 82, 82' produced. Provided in the bottom region of the insertion cassette 12 is a drop discharge opening 84 for evaporation or cooking liquids which occur within the insertion cassette. An alternative configuration (not shown) of the insertion cassettes provides that replaceable insert compartments can be used instead of the limbs 80, 80', in dependence on the meat products to be prepared.

Figure 7:
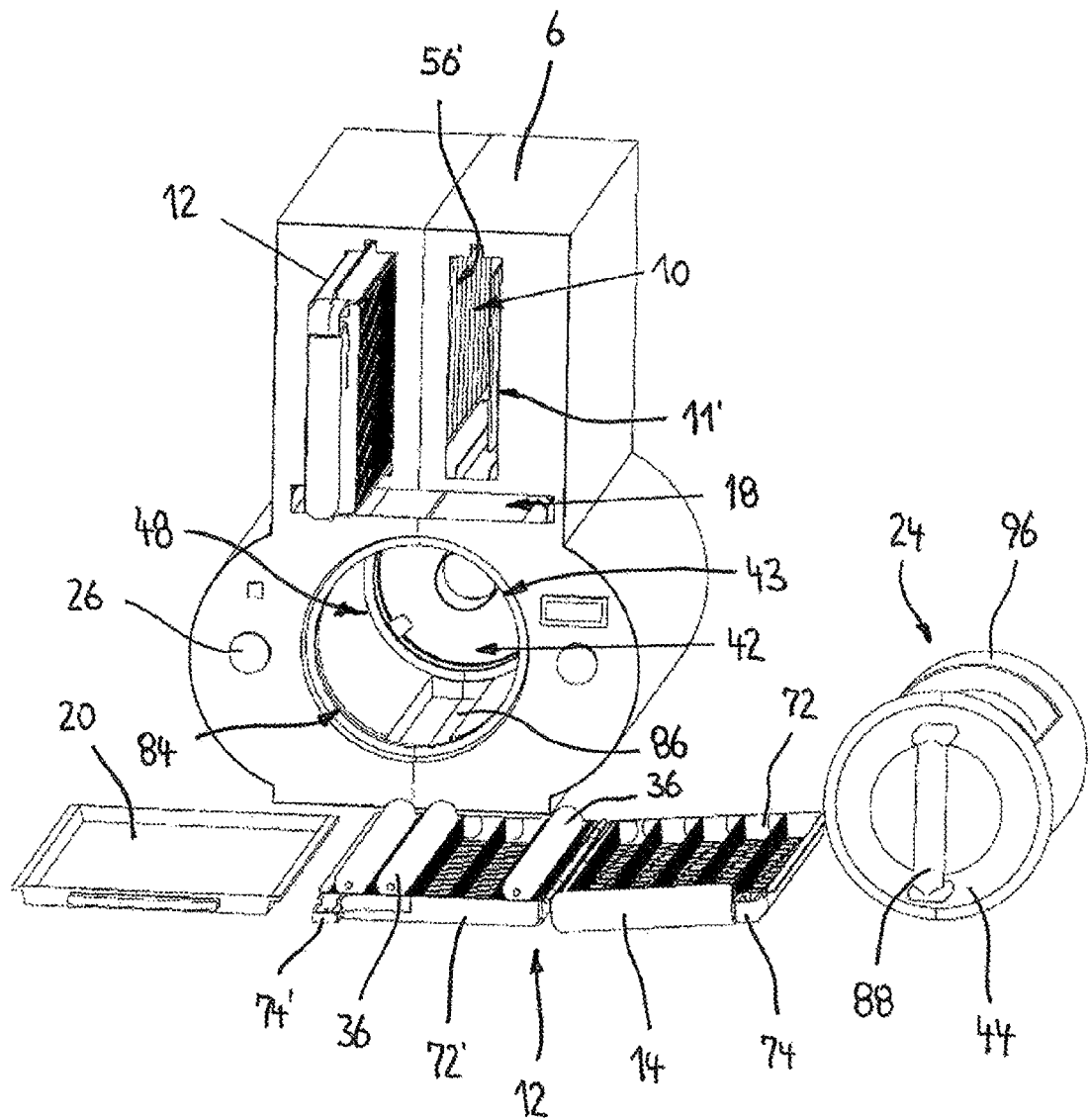
FIG. 7 shows a perspective view of the apparatus according to the invention shown in FIG. 1 with removed insertion cassette and drum.

As FIG. 7 shows the accommodating compartments 10, 10' of the grill device are substantially of a rectangular cross-section in the insertion direction 39 for the approximately cuboidal insertion cassettes 12, 12'. The chamber 42 of the hot air preparation device 4 is of a cylindrical shape. Provided in the bottom region 84 of the chamber is a receiving reservoir 86 for liquid residues. The inside wall of the chamber has a surface which facilitates and assists with cleaning, the inside wall comprising a material with a smooth surface or a material with an anti-adhesion coating. The cover 44 fixedly arranged on the peripheral portion 96 of the drum 24 is equipped with a gripping portion 88 for reversibly coupling and uncoupling the drum 24 to and from the holding means 48.

Figure 8:
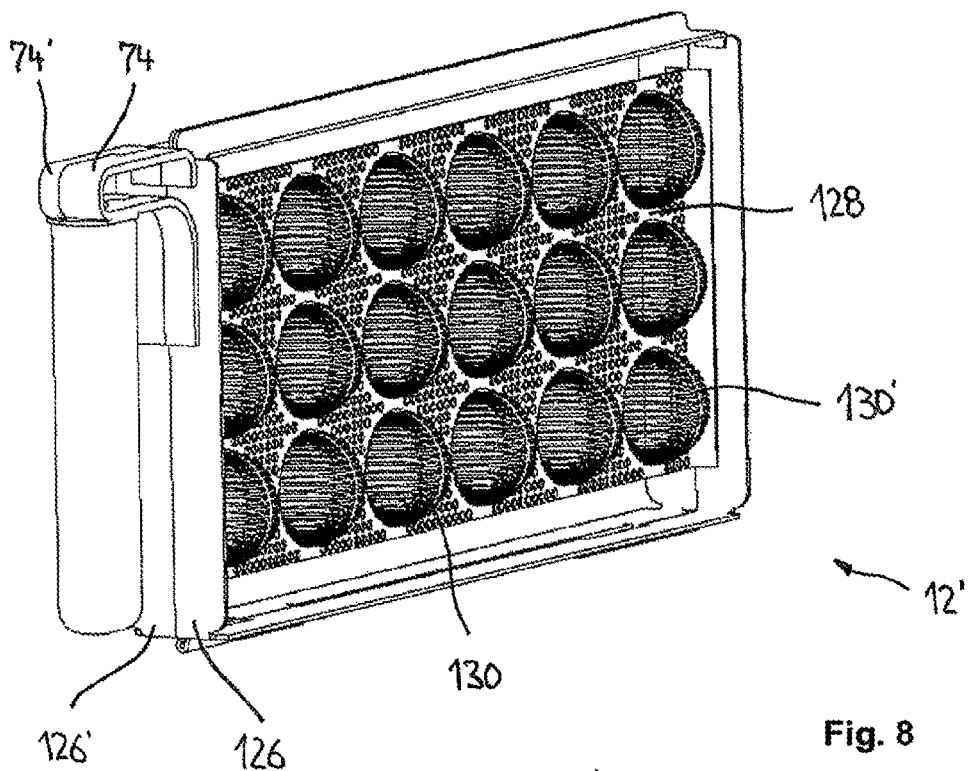
FIGS. 8 through 11 show perspective views of an alternative embodiment of the insertion cassettes according to the invention.
Figure 9:
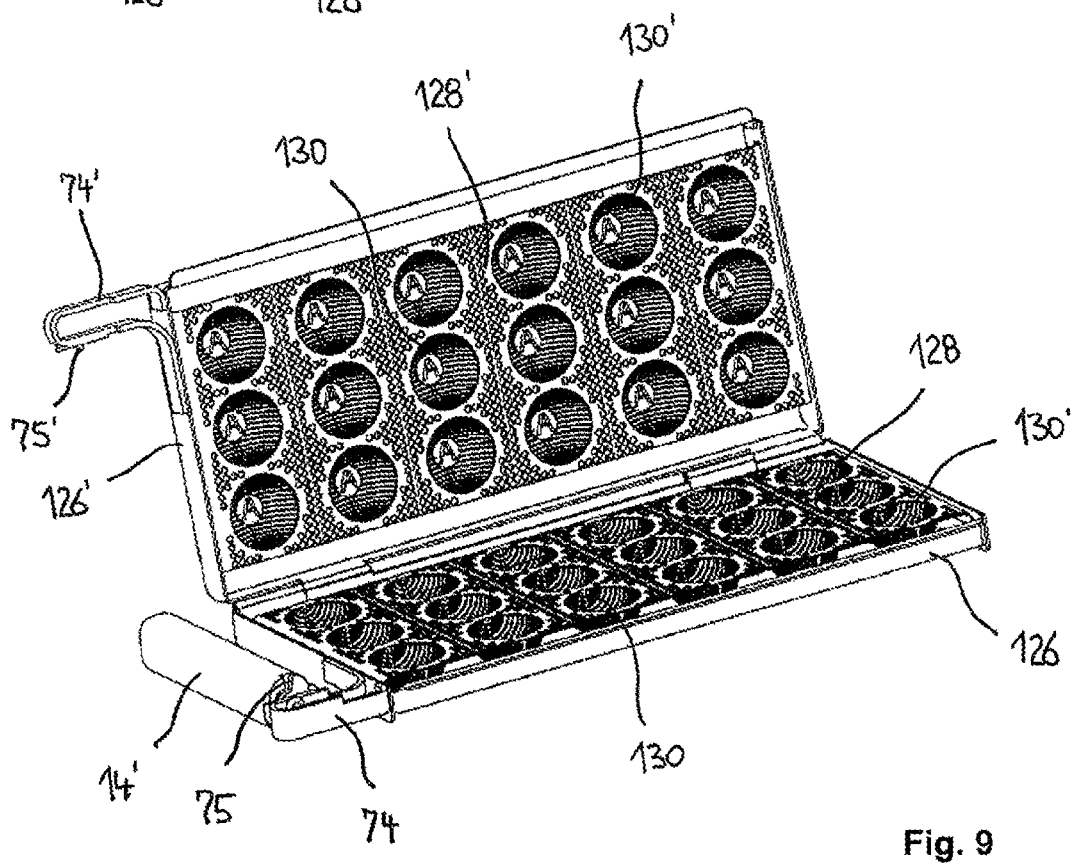

FIGS. 8 and 9 show a further embodiment of an insertion cassette 12' which can be inserted into the accommodating compartments 10, 10' of the apparatus 1 and which has two casing portions 126, 126' which are pivotably moveably connected together. The casing portions 126, 126' each have a respective plate body 128, 128' which has respective mutually corresponding recesses 130, 130' at its surface region towards the plate body of the other casing portion. The recesses 130, 130' are arranged on the mutually facing surfaces in such a way that two mutually corresponding hemispherical recesses 130, 130' form a spherical hollow space when the casing portions 126, 126' are pivoted together. Spherical products of a pasty material like for example sausagemeat can be prepared in the spherical hollow space. As in the above-described embodiment, the handle 14' arranged rotatably on the casing portions 126 by way of a handle carrier 74 serves for arresting the casing portions 126, 126' to each other. By rotating the handle 14', it is brought into engagement with its locking portion 75 with a projection 75' on the handle carrier 74' on the other casing portion 126', as has already been described in greater detail with respect to FIGS. 5 and 6.

Figure 10:
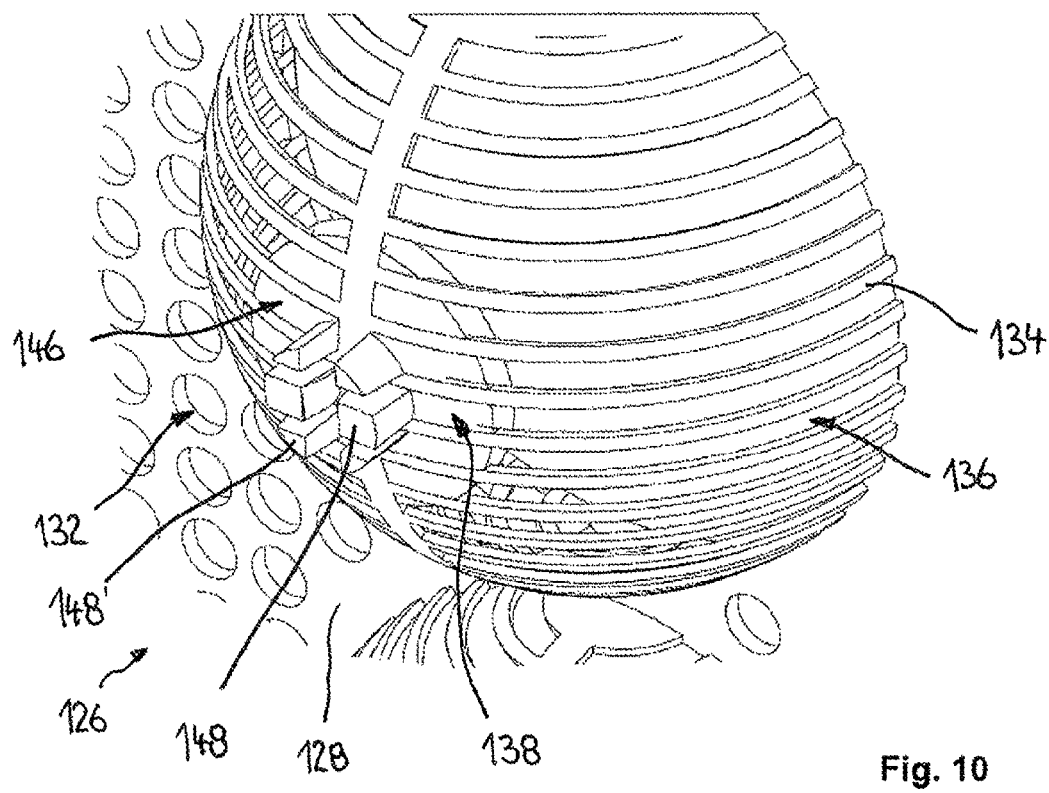

FIG. 10 shows by way of example a detail region of the casing portion 126 from the outside. As can be seen the plate body 128 has through openings 132 and the wall 34 forming the recess 130 has slot-like apertures 136. Shaping or stamping inserts 138, 138' can be positioned in the recesses 130, 130'; the inserts 138, 138' are adapted to form letters or digits in the surface of the spherical burgers or rissoles during preparation thereof.

Figure 11:
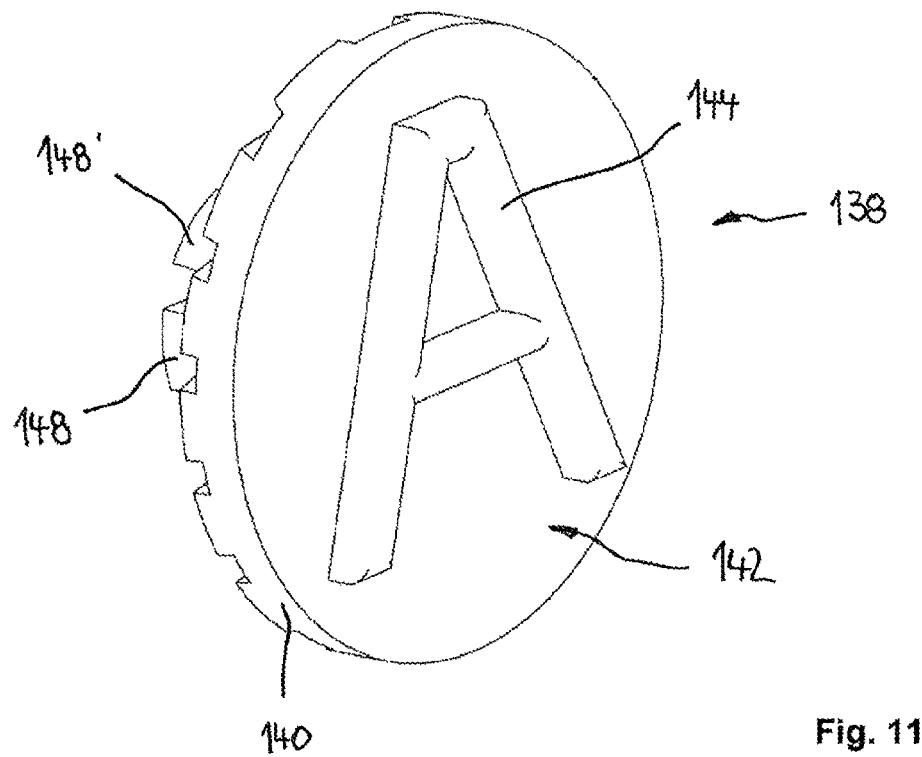

The shaping insert 138 shown by way of example in FIG. 11 has a circular flat shaping portion 140. The shaping portion 140, on its surface 142 towards the spherical hollow space, has a raised letter 144 projecting at the surface, in the form of an A. Provided on the rear side 146 of the shaping portion 140 are a plurality of clamping or push-in portions 148, 148' which project perpendicularly therefrom. The shaping insert 138 is fixed in the wall 134 of the hemispherical recess 130 on the casing portion 126 by means of the clamping or push-in portions 148, 148'. The connection between the wall 134 of the recess and the clamping or push-in portions 146, 146' of the shaping insert 138 is produced by way of a force-locking or positively locking connection whereby the shaping insert 138 is adapted to be replaceable on the casing portions 126, 126' of the insertion cassette 12.

Figure 12:
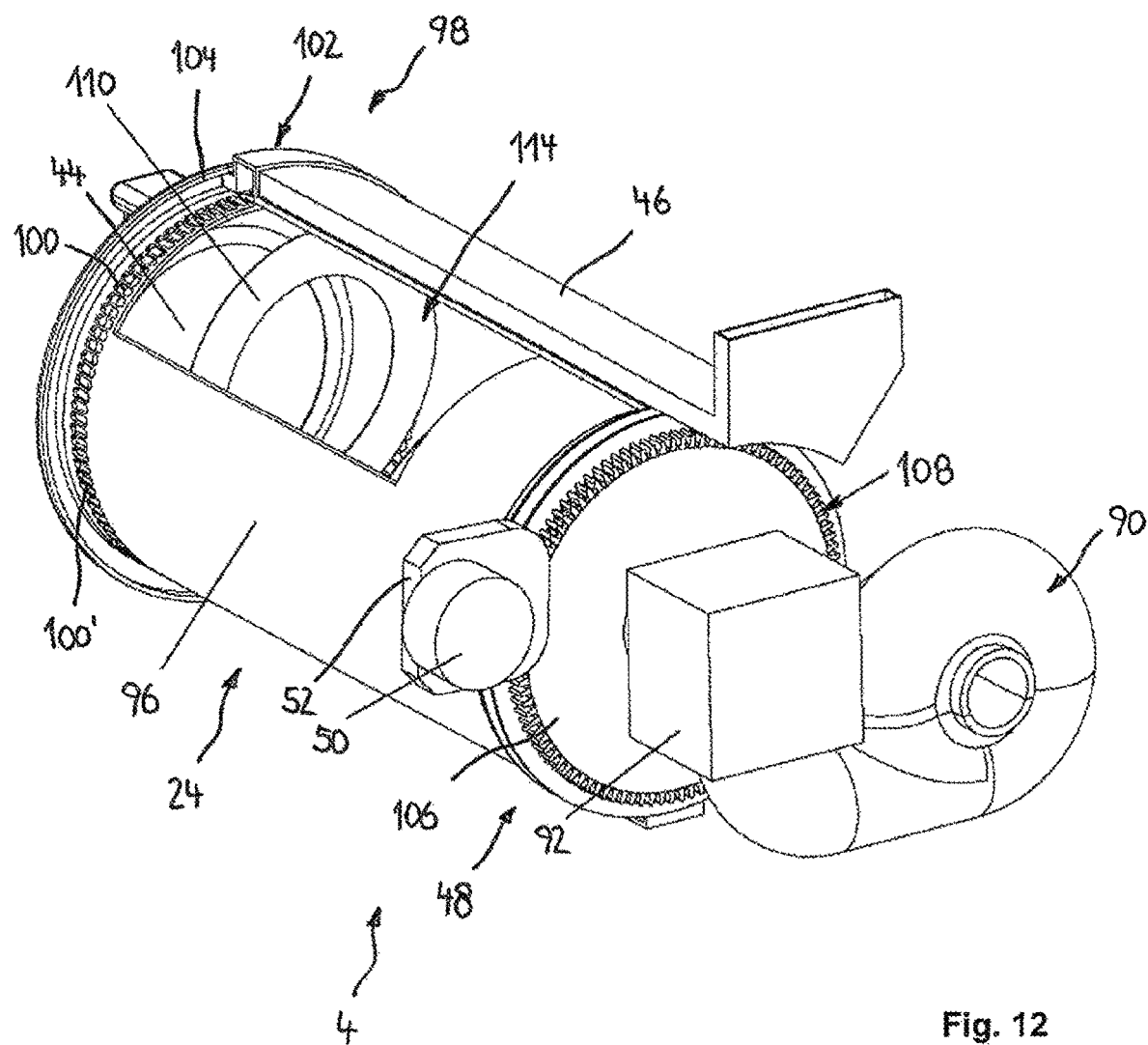
FIG. 12 shows a perspective detail view of the hot air preparation device according to the invention.

FIG. 12 shows a detail view of the hot air preparation device 4 which has a fan 90 producing an air flow guided within the appliance housing 6. For that purpose a passage (not shown in greater detail) is provided within the appliance housing. In addition the hot air preparation device 4 has a heating unit 92 which is arranged within the air flow produced and heats it to the required temperature. The hot air flow produced by the fan 90 and the heating unit 92 is introduced at the rear into the drum 24 by way of a central opening 94 in the end wall 116 (FIG. 8) and flows in the direction of the longitudinal axis of the drum 24 which has a cylindrical peripheral portion 96. Rotation of the drum means that the foodstuff in the drum is uniformly subjected to the effect of the hot air flow passing through the drum. The end region 98, which is associated with the cover 44, of the drum 24 has outlets 100, 100' preferably arranged at the periphery in the peripheral portion of the drum adjacent to the cover. The hot air flow issues from the drum in a radial direction by way of the outlets 100, 100' which are in the form of slots. Associated with the outlets 100, 100' is a discharge air guide 102, by way of which, and by way of the discharge air passage 46 connected thereto, the hot air is transferred into the grill device 2. The cover 44 of the drum 24 has sealing portions 104 which can be brought into contact with the appliance housing front 16 so that the opening 43 in the appliance housing 6 is sealingly covered over. To drive the drum 24, the arrangement uses the drive means 50 which drives the holding means 48 by means of the drive pinion (FIG. 2), the holding means 48 having a receiving portion 106 having an external tooth arrangement 108.

Figure 13:
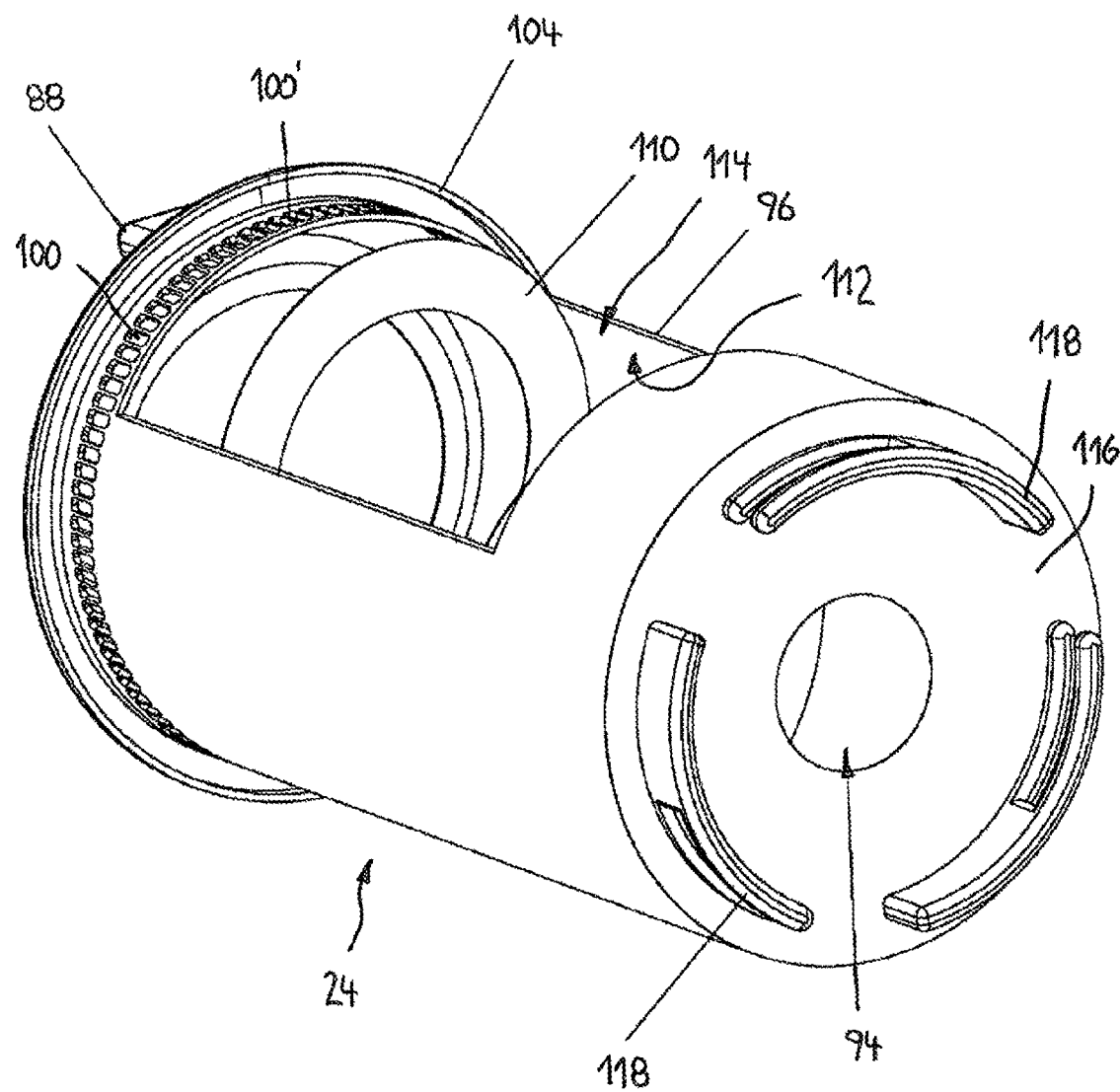
FIG. 13 shows a perspective view of the drum according to the invention.

FIG. 13 shows the configuration of the drum 24 which includes a spiral member 110 for circulating the foodstuff accommodated in the drum 24. The member 110 is of a spiral configuration and extends at least portion-wise along the inner peripheral surface 112 of the drum peripheral portion 96. The drum 24 which is removable from the chamber 42 has in the peripheral casing portion 96 a filling and removal opening 114 which in the present embodiment extends approximately over three quarters of the overall length of the drum and is of a dimension in the peripheral direction of the drum 24 of about a fifth of the overall periphery. At the end wall 116 in opposite relationship to the cover 44, the drum 24 has on the outside a plurality of locking portions 118 corresponding to latching elements 120 of the holding means 48.

Figure 14:
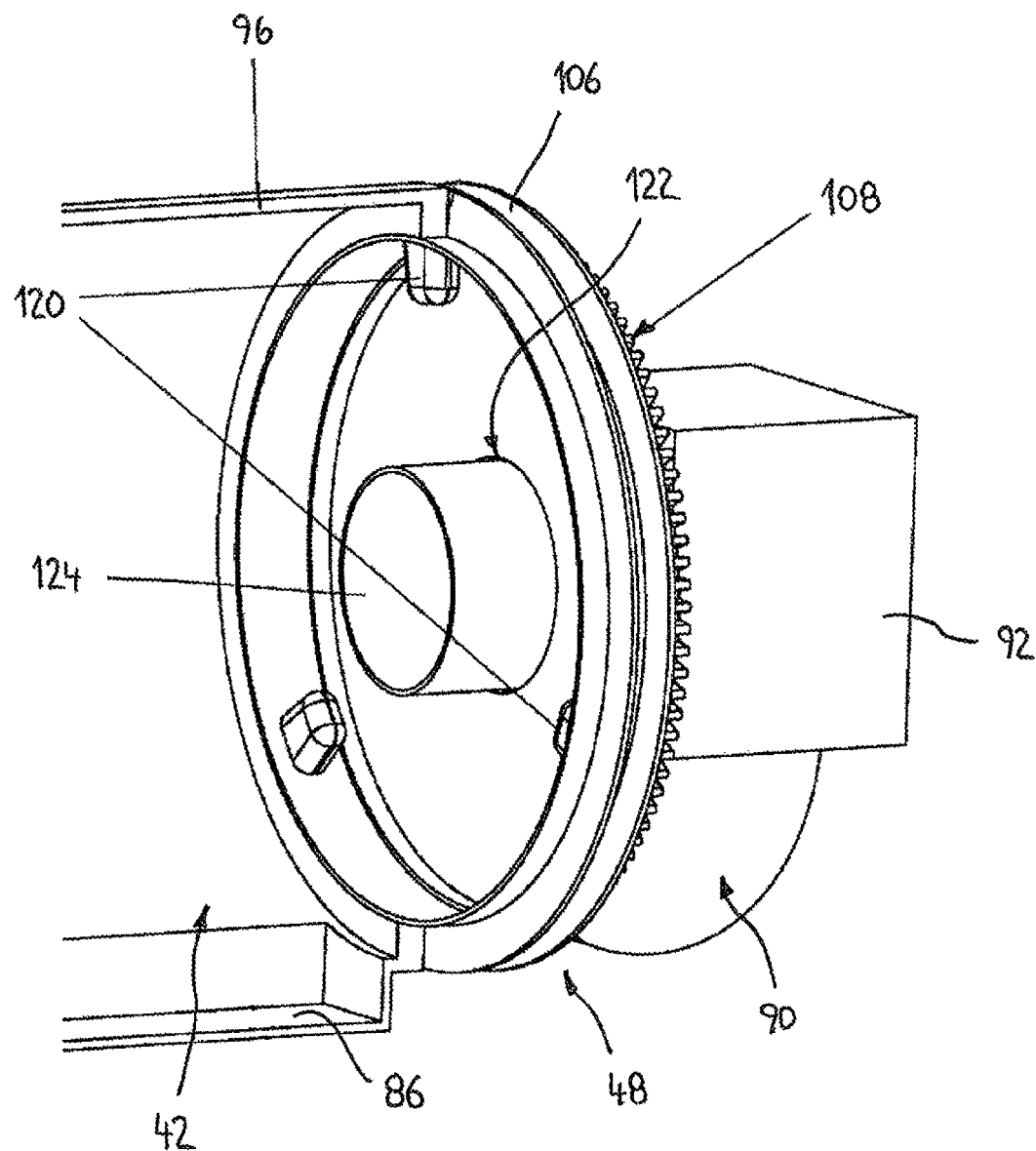
FIG. 14 shows a detail view of the drive means according to the invention as shown in FIG. 7.

FIG. 14 is a partial section through the chamber 42 of the hot air preparation device 4, the drum 24 being omitted from this view for clearer illustration thereof. The holding means 48 has a receiving portion 106 which is mounted rotatably at the rear side of the chamber 42 and on which are arranged latching elements 120 projecting inwardly in the radial direction. The forked locking portions 118 (see FIG. 8) of the drum 24 engage around or behind the latching elements 120 whereby a connection which is rotationally fixed in the drive direction is produced between the holding means 48 and the drum 24. To be able to uncouple the drum 24 from the holding means 48, the drum 24 is to be rotated in opposite relationship to the drive direction by way of the gripping portion 88 on the cover 44. Centrally in relation to the axis of rotation the receiving portion 106 has an aperture 122 through which a hot air inlet 124 of the fan 90 projects, and which extends to a position through the central opening 94 at the end wall 116 of the drum 24. That ensures a reliable entrance of the hot air flow produced, into the drum 24.

Figure 15:
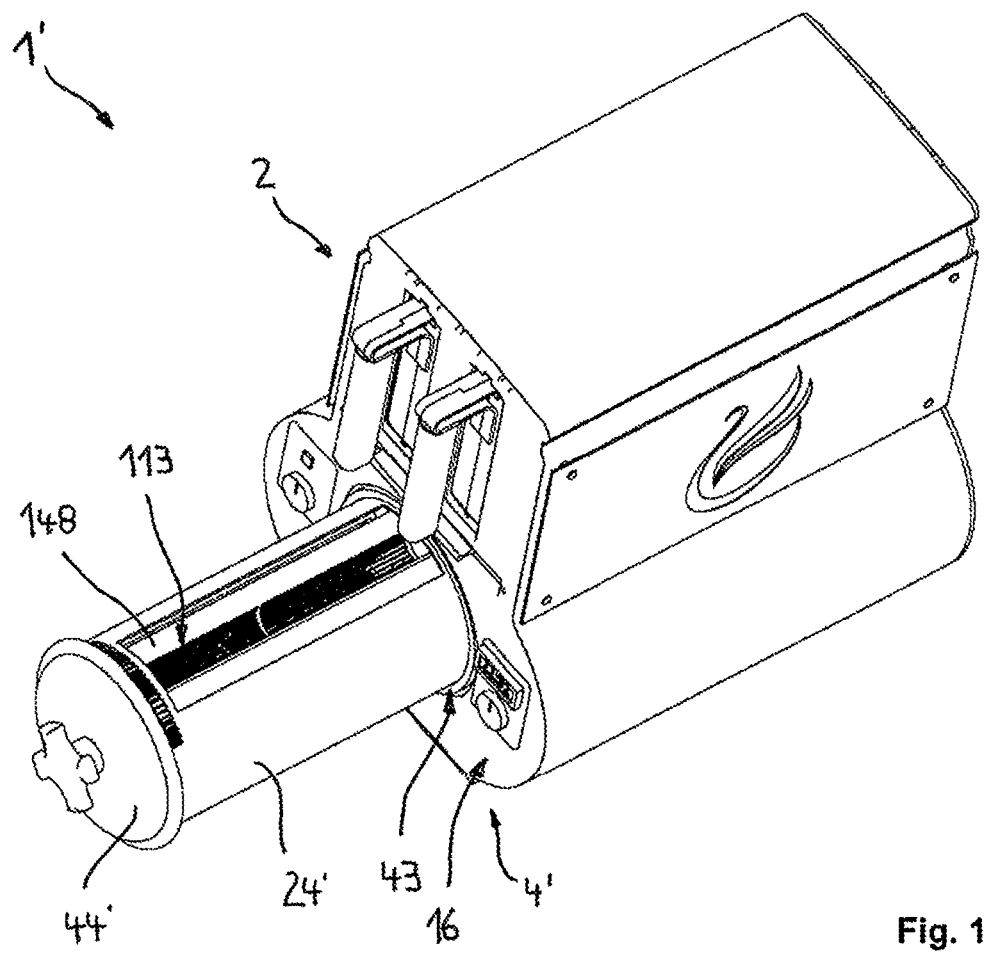
FIG. 15 shows a further embodiment of an apparatus according to the invention.

FIG. 15 shows a further embodiment of an apparatus 1' according to the invention, having a grill device 2 and a hot air preparation device 4' arranged beneath the grill device 2. In regard to the structural features of the grill device 2, attention is directed to the foregoing description relating to the previous embodiments. The hot air preparation device 4 which is in the form of a boiling unit has a rotatably mounted drum 24' having an accommodating chamber 113 and an accommodating basket 148 arranged in the accommodating chamber 113. The basket 148 is in particular adapted to expose the foodstuffs to be prepared like for example cooking or boiling sausage in specifically targeted fashion in a predetermined orientation or arrangement, to the hot air flow passing through the chamber. The drum 24' can be inserted together with the basket 148 and with the cover 44' fixedly arranged on the basket into the opening 43 into the appliance housing front 16. In that case the opening 43 of the chamber 42 is sealingly closed by the cover 44'.

Figure 16:
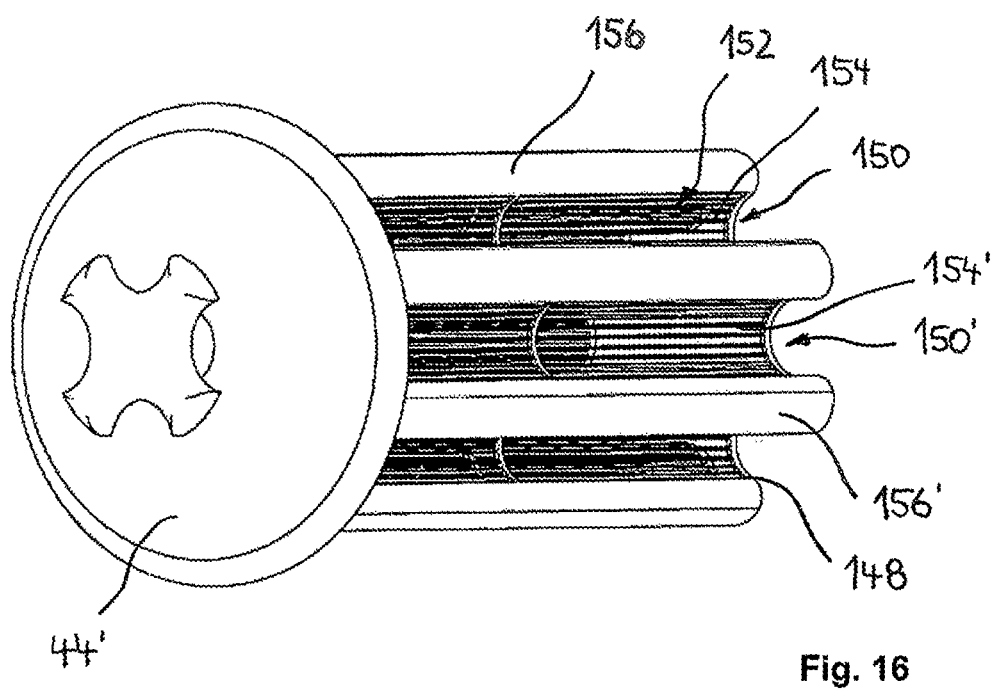
FIG. 16 shows a perspective view of a accommodating basket for foodstuffs.

FIG. 16 shows a detail view of the accommodating basket 148 and the cover 44' arranged at an end of the basket. The basket 148 has at its periphery a plurality of uniformly distributed accommodating compartments 150, 150'. Each accommodating compartment 150, 150' has a wall surface 152 of a shape of which regions are cylindrical. The wall surface 152 is made up of a plurality of bars 154, 154' which are arranged parallel and at a spacing from each other. The wall surface 152 thus has a plurality of apertures which extend in the longitudinal direction of the accommodating compartments 150, 150' and by way of which the hot vapor produced comes into contact with the surface of the foodstuffs to be prepared. Arranged between the accommodating compartments 150, 150' are respective connecting structures 156, 156' having convexly shaped wall portions which in contrast to the wall surfaces 152 of the accommodating compartments 150, 150' form closed wall surfaces.

Figure 17:
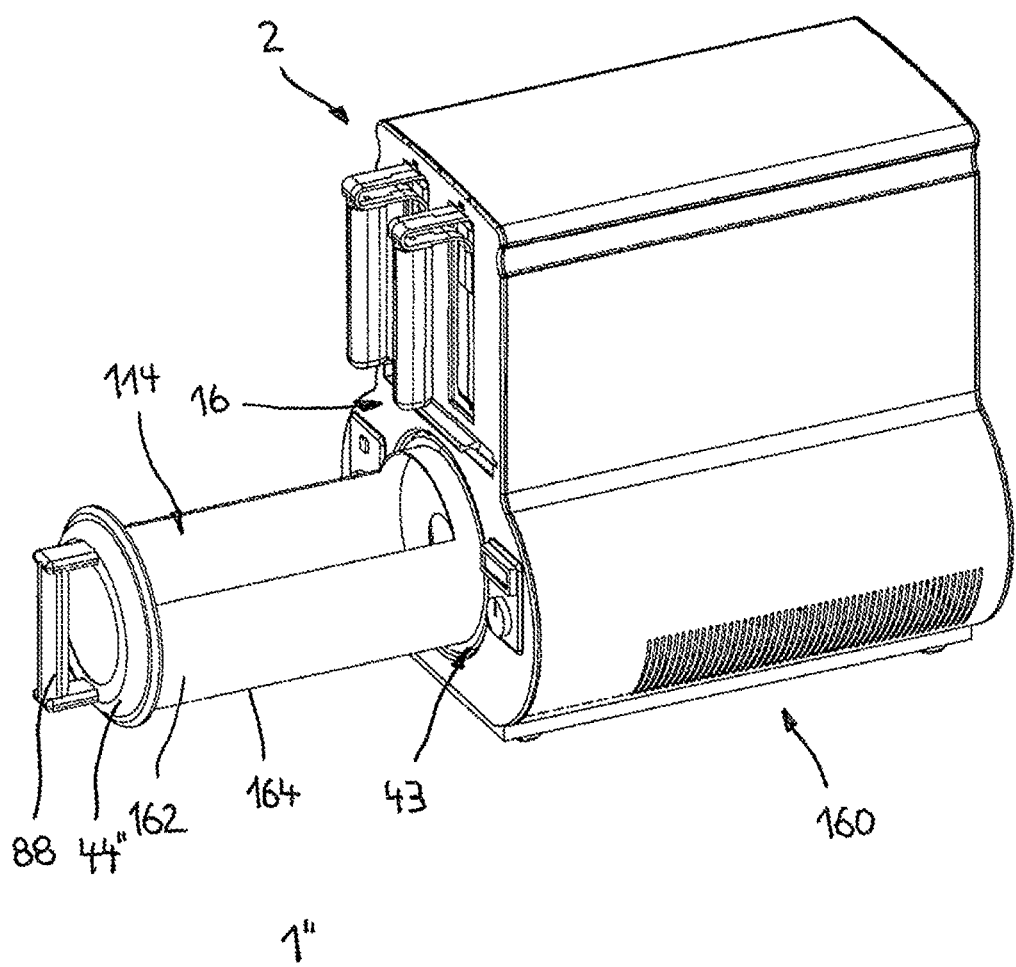
FIG. 17 shows a third embodiment of an apparatus according to the invention.

FIG. 17 shows a further embodiment of an apparatus 1' according to the invention which, besides the grill device 2, has a cooling device 160 for at least intermediate storage of foodstuffs to be prepared. The cooling device 160, like also the hot air preparation device 4, 4', is arranged beneath the grill device 2 and has an opening 43 in the appliance housing front 16. The cooling device 16 includes a substantially cylindrical cooling chamber in which an accommodating compartment for the foodstuffs, that is of a complementary configuration, can be inserted and removed again. Like the cooling chamber the accommodating compartment has a substantially cylindrical wall 164 on which there is provided a filling and removal opening 114. The filling and removal opening 114 extends substantially over the entire length of the accommodating compartment 162. Arranged at an end of the accommodating compartment is a cover 44" fixedly connected to the accommodating compartment 162. The cover 44", after insertion of the accommodating compartment 162 into the cooling chamber, sealingly covers the opening 43 of the cooling device 160. A gripping portion 88 is arranged on the cover 44". With the gripping portion 88, the accommodating compartment 162 can be pulled out of the cooling chamber and pushed into the cooling chamber again.

Preferred aspects of the present invention are set forth hereinafter, using the references employed hereinbefore. In that respect the references are non-limiting but are only to be interpreted as means for making it easier to understand and read the aspects, for the specified aspects do not exclusively relate to the above-discussed Figures. The aspects set forth hereinafter include features which can be combined with other preferred features which are to be found in the description and/or the claims.

LIST OF REFERENCES 1, 1', 1" apparatus
2 grill device
4, 4' hot air preparation device
6 appliance housing
8 portion
10, 10' accommodating compartment
11, 11', 43 opening
12, 12' insertion cassette
14, 14' handle
16 appliance housing front
18 insert
20 catch container
22 cylindrical portion
24, 24' drum
26, 26' operating and regulating elements
28 display device
29 outer casing
30, 30' side wall
32, 32' aperture
34 heating device
36 meat product
38 abutment element
39 insertion direction
40 guide
42 chamber
43 opening
44, 44', 44" cover
46 discharge air passage
48 holding means
50 drive means
52 coupling transmission
54 drive pinion
56, 56' heating element
58, 58' discharge air filter unit
59 push-in plug receptacle
60, 60' filter element
62 outlet opening
64 bottom plate
66 blowing-in openings
68 carrier plate
70 resistance wire
72, 72' casing portions
74, 74' handle carrier
75 locking portions
75' projection
76 hinges
78 accommodating chamber
80, 80' limbs
82, 82' insert compartment
84 bottom region
86 receiving reservoir
88 gripping portion
90 fan
92 heating unit
94 central opening
96 peripheral portion
98 end region
100, 100' outlet
102 discharge air guide
104 sealing portion
106 accommodating portion
108 external tooth arrangement
110 spiral member
112 peripheral surface
113 accommodating chamber
114 filling and removal opening
116 end wall
118 locking portion
120 latching element
122 aperture
124 hot air inlet
126, 126' casing portion
128, 128' plate body
130, 130' recess
132 through opening
134 wall
136 aperture
138, 138' shaping insert
140 shaping portion
142 surface
144 characters
146, 146' clamping or push-in portions
148 accommodating basket
150, 150' accommodating compartment
152 wall surface
154, 154 bar
156, 156' connecting limb
160 cooling device
162 accommodating compartment
164 wall

The invention claimed is:

1. An apparatus for heating and/or cooking products, the apparatus comprising:
an appliance housing with at least one opening;
an accommodating device for the products to be heated;
a hot air preparation device comprising a fan, a heating unit disposed in air flow produced by the fan and guided within the appliance housing, a chamber, and one or more drums rotatably received in the hot air flow, such that the products in the drum are exposed uniformly to the hot air flow flowing through the chamber; and
a heating device associated with the accommodating device and having one or more heating elements,
wherein the accommodating device comprises one or more accommodating compartments which are accessible by way of the opening, and an insertion cassette which corresponds to a respective accommodating compartment and which is configured to be loaded with one or more products in a predetermined orientation relative to each other and is adapted to be introduced into and removed again from the accommodating compartment.

2. The apparatus of claim 1, wherein the accommodating compartment has an insertion direction extending substantially in horizontal directions, and the opening in the appliance housing is substantially completely filled up by a wall region of the insertion cassette which is configured to be inserted in the accommodating compartment.

3. The apparatus of claim 2, wherein the insertion cassette has an outer casing comprising two moveably mutually pivotably connected casing portions.

4. The apparatus of claim 3, wherein the casing portions have limbs extending parallel to each other at predetermined spacings for subdividing the accommodating compartments for the products.

5. The apparatus of claim 3, wherein the casing portions comprise two plate bodies pivotably moveably connected together and, which on mutually facing surface regions, have mutually corresponding recesses.

6. The apparatus of claim 3, wherein the casing portions of the insertion cassette have outwardly projecting abutment elements adapted to hold the casing portions which are brought into contact with each other and received in a guide of the accommodating compartment.

7. The apparatus of claim 1, wherein the insertion cassette has a handle arranged rotatably on a handle carrier of a first casing portion, the handle being configured to be brought into a locking position or a release position with its locking portion with a projection on the handle carrier of a second casing portion by rotation about its longitudinal axis.

8. The apparatus of claim 1, wherein the drum has a cylindrical accommodating chamber for the products and is provided with a central opening for introduction of the hot air flow at an end wall.

9. The apparatus of claim 1, wherein the drum has a stationary spiral member extending in a spiral form along its inside peripheral surface for circulating the products accommodated in the drum.

10. The apparatus of claim 1, wherein the drum can be reversibly coupled and uncoupled with a holding means mounted rotatably in the chamber, wherein the holding means is rotationally drivingly coupled to a drive means.

11. The apparatus of claim 1, wherein the drum has a transparent cover which covers the opening of the chamber in the appliance housing and which is rigidly connected to the peripheral portion of the drum.

12. The apparatus of claim 1, wherein the drum has one or more sealing portions configured to be brought into sealing contact with a chamber rear wall or a hot air inlet.

13. The apparatus of claim 1, further comprising a discharge air passage which connects the hot air preparation device to the accommodating device for the products and which carries a partial amount of the hot air flow.

14. The apparatus of claim 1, wherein the hot air preparation device is coupled in signal-conducting relationship to an electronic control unit for controlling the cooking temperature and/or cooking times.

15. The apparatus of claim 1, further comprising a discharge air filter unit through which the air flow through the appliance housing is passed, the discharge air filter unit being arranged downstream of the accommodating device for the products.

16. The apparatus of claim 1, further comprising a cooling device for the products.

17. The apparatus of claim 1, wherein the drum includes an accommodating basket displaceable in the drum and having one or more accommodating compartments distributed along the basket periphery for accommodating the products.

18. The apparatus of claim 11, wherein the cover of the drum has sealing portions configured to be brought into sealing contact with the outside of the appliance housing front of the appliance housing.

19. The apparatus of claim 1, wherein the product are meat products.

* * * * *